US011898300B2

(12) United States Patent
Seok et al.

(10) Patent No.: US 11,898,300 B2
(45) **Date of Patent: *Feb. 13, 2024**

(54) LAUNDRY PROCESSING APPARATUS

(71) Applicant: LG Electronics Inc., Seoul (KR)

(72) Inventors: Bae Yee Seok, Seoul (KR); Cheolu Choi, Seoul (KR); Hyun Sang Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,481

(22) Filed: May 9, 2022

(65) Prior Publication Data

US 2022/0267945 A1 Aug. 25, 2022

Related U.S. Application Data

(63) Continuation of application No. 16/929,678, filed on Jul. 15, 2020, now Pat. No. 11,352,736.

(30) Foreign Application Priority Data

Jul. 15, 2019 (KR) ........................ 10-2019-0085402
Jan. 7, 2020 (KR) ........................ 10-2020-0002279

(51) Int. Cl.
*D06F 58/26* (2006.01)
*B08B 3/02* (2006.01)
*D06F 58/02* (2006.01)

(52) U.S. Cl.
CPC ................ *D06F 58/26* (2013.01); *B08B 3/02* (2013.01); *D06F 58/02* (2013.01)

(58) Field of Classification Search
CPC ............ D06F 58/26; D06F 58/02; B08B 3/02
(Continued)

(56) References Cited

U.S. PATENT DOCUMENTS 4,270,281 A * 6/1981 Muller .................... D06F 58/26 34/607
6,585,781 B1 * 7/2003 Roseen ................... D06F 58/20 8/149.1

(Continued)

FOREIGN PATENT DOCUMENTS

CN 101054767 10/2007
CN 101821443 9/2010

(Continued)

OTHER PUBLICATIONS

Chinese Office Action in Chinese Application No. 202080051839.1, dated Mar. 18, 2023, 16 pages (with machine translation).
Office Action in Australian Appln. No. 2020312373, dated Apr. 17, 2023, 4 pages.

*Primary Examiner* — Stephen M Gravini
(74) *Attorney, Agent, or Firm* — Fish & Richardson P.C.

(57) ABSTRACT

A laundry processing apparatus include a washing unit provided in an installation space of a cabinet, which corresponds to an upper portion of a heat exchanger and has the installation space therein, to spray washing water to a front surface of an evaporator. The washing unit has a nozzle part provided at the upper portion of the heat exchanger in an inclined direction to guide the washing water toward the heat exchanger and a front guide part provided at an opposite side of the nozzle part while being space apart therefrom, with the front surface of the evaporator that is the heat exchanger interposed between the front guide part, guiding the washing water discharged from the nozzle part toward the front surface of the evaporator.

12 Claims, 19 Drawing Sheets

(58) Field of Classification Search
USPC .............................................................. 34/85
See application file for complete search history.

(56) References Cited

U.S. PATENT DOCUMENTS

| | | | | |
|---|---|---|---|---|
| 9,335,095 | B2 * | 5/2016 | Bison | D06F 39/12 |
| 9,976,249 | B2 * | 5/2018 | Lv | D06F 58/02 |
| 10,006,721 | B2 * | 6/2018 | Kohavi | F28F 9/0275 |
| 10,087,569 | B2 * | 10/2018 | Bocchino | B01D 46/79 |
| 10,995,449 | B2 * | 5/2021 | Pattarello | D06F 58/38 |
| 11,352,736 | B2 * | 6/2022 | Seok | D06F 58/22 |
| 11,486,082 | B2 * | 11/2022 | Noh | D06F 58/38 |
| 2012/0246960 | A1 | 10/2012 | Lee et al. | |
| 2016/0115636 | A1 | 4/2016 | Kim et al. | |
| 2022/0267945 | A1 * | 8/2022 | Seok | D06F 58/26 |

FOREIGN PATENT DOCUMENTS

| | | | | |
|---|---|---|---|---|
| CN | 103547728 | | 1/2014 | |
| CN | 104790345 | | 7/2015 | |
| CN | 105040795 | | 11/2015 | |
| CN | 106676859 | | 5/2017 | |
| CN | 106939493 | | 7/2017 | |
| EP | 2628846 | | 8/2013 | |
| EP | 2708639 | | 3/2014 | |
| EP | 2895651 | A1 | 6/2020 | |
| EP | 3767027 | A1 * | 1/2021 | D06F 58/22 |
| EP | 3767027 | A1 | 1/2021 | |
| WO | WO 2009077291 | | 6/2009 | |
| WO | WO 2016204414 | | 12/2016 | |
| WO | WO-2021010743 | A1 * | 1/2021 | B08B 3/02 |

* cited by examiner

LAUNDRY PROCESSING APPARATUS

CROSS REFERENCE TO RELATED APPLICATIONS

The present application is a continuation of U.S. Application Ser. No. 16/929,678, filed on Jul. 15, 2020, which claims priority to Korean Patent Application No. 10-2019-0085402, filed on Jul. 15, 2019, and Korean Patent Application No. 10-2020-0002279, filed on Jan. 7, 2020, the entire contents of which are incorporated herein for all purposes by reference.

TECHNICAL FIELD

The present disclosure relates generally to a laundry processing apparatus having a drying function for clothing, bed linen, etc. More particularly, the present disclosure relates to a laundry processing apparatus having a washing unit capable of washing a heat exchanger installed in the laundry processing apparatus.

BACKGROUND

Generally, a laundry processing apparatus means all devices for managing clothing, such as washing, drying, and removing wrinkles, at home or at laundromat. For example, the laundry processing apparatus includes a washing machine for clothing, a drying machine for clothing, a washing machine having both drying and washing functions, a refresher for refreshing clothing, a steamer for removing wrinkles of clothing, and the like.

The clothing drying machine of the laundry processing apparatus includes a heat pump system. The clothing drying machine is configured to supply high temperature air to an object to be processed such as clothing and bed linen (hereinafter, which referred to as clothing) which are inserted into a processing space (drum or steamed space in which clothing hangs), through the operation of the heat pump system. Thus, moisture contained in the clothing to be processed is evaporated so that the clothing to be processed is dried.

The clothing drying machine may include an exhaust type drying machine and a condensation type drying machine that are classified according to the processing method of high temperature and humidity air escaping from a processing space after drying the clothing to be processed. The exhaust type drying machine is configured to discharge the high temperature and humidity air generated during drying operation directly to the outside of the drying machine. The condensation type drying machine is configured to condense moisture contained in the air through the heat exchange while circulating the high temperature and humidity air without discharging the high temperature and humidity air to the outside.

Meanwhile, Korean Patent Application Publication No. 10-2012-0110498 and U.S. Pat. No. 9,134,067 B2 propose the laundry processing apparatus, wherein condensed water is generated while the high temperature and humidity air generated for drying heated air passes through an evaporator, which is a heat exchanger, and an air inlet portion of the evaporator is washed by using the generated condensed water or water supplied through a water pipe.

Accordingly, even when foreign matter such as lint generated from the clothing to be processed is collected on the air inlet portion (front surface) of the evaporator, the air inlet portion is periodically washed, thus the deterioration of heat exchange performance by the evaporator may be prevented.

In particular, since the method of washing the evaporator by itself using the generated condensed water (hereinafter, it is referred to as "self-washing") does not use a method of receiving water through the water pipe, the laundry processing apparatus can be installed anywhere indoors.

However, the self-washing type laundry processing apparatus according to the related art has a problem in that a front surface of the evaporator is not sufficiently washed. In order to increase the washing rate of the front surface of the evaporator, washing water (condensed water) should remove foreign matter such as lint while flowing downward in a direction of gravity along the front surface of the heat exchanger. However, the condensed water does not flow along the surface of the evaporator and flows into the evaporator, thus a lower portion of the front surface of the evaporator is not sufficiently washed.

The deviation of the washing water may be caused due to various reasons: (i) the condensed water spraying toward the surface of the evaporator flows into the evaporator by a blowing force of air blown toward the evaporator during the operational process of a heat pump; (ii) the surface tension of an outer surface of the evaporator is reduced due to a coating layer treated on the outer surface of the evaporator for waterproofing, so that the condensed water may penetrate into the evaporator; or (iii) the washing water may be introduced into the evaporator by the Coanda effect in which fluid formed near a surface of an object is attached to the surface of the object by difference in pressure.

Further, the amount of the condensed water generated in the operational process of the self-washing type laundry processing apparatus is in proportion to the amount of the clothing to be processed, so the cleaning flow rate of the condensed water is not constant. When the amount of the condensed water is large, at least part of the condensed water is discharged ahead of the surface of the evaporator, so that the flow rate flowing the surface of the evaporator may be sufficiently supplied even when the condensed water is discharged by deviating toward the evaporator due to the reasons described above. On the other hand, when the amount of the condensed water is small, the condensed water cannot be discharged ahead of the surface of the evaporator and penetrates into the inside of the evaporator thereby degrading the performance of washing the evaporator.

DOCUMENTS OF RELATED ART (Patent Document 1) Korean Patent Application Publication No. 10-2012-0110498; and (Patent Document 2) U.S. Pat. No. 9,134,067 B2

SUMMARY

Accordingly, the present disclosure has been made keeping in mind the above problems occurring in the related art, and the present disclosure is intended to guide a discharge direction of condensed water (washing water) so that the discharge direction thereof directs ahead of a surface of a heat exchanger, thereby washing evenly to a lower side of the surface of the heat exchanger.

Another objective of the present disclosure is to effectively wash the surface of the heat exchanger even when the amount of the condensed water (washing water) is not constant.

In order to achieve the above objectives, according to one aspect of the present disclosure, there is provided a laundry processing apparatus. In the laundry processing apparatus, a washing unit may be provided in an installation space of a cabinet, which may have the installation space therein and correspond to an upper portion of the heat exchanger, to spray washing water to a front surface of the heat exchanger into which exhaust air flows. The washing unit may have a guide end, the guide end may protrude from an end of a nozzle part toward a front guide part, or protrude from an end of the front guide part to face a surface the heat exchanger. The guide end may guide the washing water toward the front surface of the heat exchanger, so that the washing water may perform the washing evenly to a lower side of the front surface of the heat exchanger without being introduced into the heat exchanger.

In the present disclosure, the washing unit is provided in the installation space of the cabinet, which may have the installation space therein and correspond to the upper portion of the heat exchanger, to spray the washing water to the front surface of the heat exchanger into which the exhaust air may flow. Herein, the washing unit may have: the nozzle part provided at the upper portion of the heat exchanger in the inclined direction to guide the washing water toward the heat exchanger; and the front guide part provided at an opposite side of the nozzle part while being spaced apart therefrom, with the front surface of the heat exchanger interposed between the nozzle part and the front guide part, to guide the washing water toward the front surface of the heat exchanger. A nozzle guide end may protrude from an end of the nozzle part, and the nozzle guide end may guide the washing water to be sprayed at a predetermined angle ahead of the front surface of the heat exchanger, considering the tendency of the washing water to be deviated to the inside of the heat exchanger.

The guide end may be the nozzle guide end protruding from the end of the nozzle part toward the front guide part, and a relative ratio (X/L) between a protruding length (X) of the nozzle guide end and a distance (L) between the nozzle guide end and the front guide part may be set between 0.04 to 0.15 so that the optimum washing water spray angle (β°) may be obtained. Accordingly, the washing rate may be improved.

An inclined or curved spray surface that is continuously extended from the end of the nozzle part may be formed at an upper surface of the nozzle guide end. The spray surface may include: a first inclined surface protruding from the nozzle part; and a second inclined surface protruding from the first inclined surface and extended in a downward inclined direction toward a front of the heat exchanger than the first inclined surface. The inclined or curved front guide part may deliver smoothly the washing water toward the front guide part. Therefore, even when the flow rate of the washing water is reduced, the washing water may be prevented from being sprayed directly toward the front surface of the heat exchanger without passing through the front guide part.

The spray surface of the nozzle guide end through which the washing water may flow may be extended at a gentle angle than an angle at which the nozzle part may be inclined at a downward inclined angle toward an outer surface of the heat exchanger, or may be extended in an upward inclined direction toward the front guide part. The spray surface may prevent the washing water from being sprayed directly toward the front surface of the heat exchanger without passing through the front guide part.

The nozzle part may be connected to an outlet of the water tube, and be arranged between a base extended toward the front of the heat exchanger while being inclined downward and a cover extended while being spaced upward from the base. The nozzle guide end may have a protruding shape from the nozzle part, thus the nozzle guide may be formed while using an existing shape of the nozzle part.

The base may include: a connection channel extended from the outlet of the water tub and having a height gradually lowered toward the front surface of the heat exchanger along a direction of gravity; and a discharge channel extended from the connection channel toward the front of the heat exchanger and having an inclined angle larger than an inclined angle of the connection channel. The nozzle guide end may protrude from an end of the discharge channel. Herein, the discharge channel may have a steeply inclined surface extended toward the front of the heat exchanger and having an inclined angle larger than the discharge channel. The steeply inclined surface may provide a steep slope to guide the flow rate of the washing water to be faster. The washing water with increased flow rate may be delivered fast toward the front guide part while passing through the spray surface.

The nozzle guide end may be in a position retracted from the front surface of the heat exchanger based on a direction of moving the washing water and be spaced upward from an upper surface of the heat exchanger, the end of the front guide part may be spaced apart from the front surface of the heat exchanger and be in a position lower than the upper surface of the heat exchanger. Whereby, the washing water discharged from the nozzle part may be smoothly supplied to the front surface of the heat exchanger without interference with the heat exchanger, and the washing water may be prevented from being sprayed to the upper surface of the heat exchanger.

The nozzle guide end may be in a relatively higher position than the end of the front guide part based on the direction of gravity. The nozzle guide end at the relatively high position may supply the washing water to the end of the front guide part at the relatively low position, so that the supply of the washing water may be stable.

When a distance (D2) in which the nozzle guide end is retracted from the front surface of the heat exchanger is between 2.0 mm to 5.0 mm and a height (H2) in which the nozzle guide end is spaced upward from the upper surface of the heat exchanger is between 1.5 mm to 4.5 mm, a length (X) in which the nozzle guide end protrudes toward the front guide part may be between 0.3 mm to 1.1 mm. The washing rate may be improved by the protruding length.

the washing water discharged from the washing unit may be discharged through between the nozzle guide end and the front guide part, and the spray angle (β) formed in a direction away from the front surface of the heat exchanger based on the direction of gravity may be between 5° to 15°, and the internal angle (α) formed between the upper surface of the nozzle guide end and the outer surface of the discharge channel may be between 750 to 125°.

The nozzle guide end may be extended in a left to right width direction of the nozzle part. A plurality of nozzle guide ends that are spaced apart from each other may be arranged in the discharge channel of the nozzle part in a left to right direction of the discharge channel, and falling spaces that are open in the direction of gravity may be formed between the nozzle guide ends. The falling space may prevent all of the washing water from being sprayed forward of the heat exchanger when the flow rate of the washing water is fast.

A length (X1) in which the nozzle guide end may protrude toward the front guide part or a thickness (Y1) of the nozzle guide end may be configured to be different from each other depending on a left to right width direction of the nozzle part.

The installation space may have a base cover that covers at least a part of the upper portion of the heat exchanger, the base cover may be configured by assembling a front cover and a rear cover to each other, and the front guide part may be provided at a lower surface of the front cover and the nozzle part may be provided at a lower surface of the rear cover.

Meanwhile, the guide end may be a front guide end that may protrude from the end of the front guide part to face the surface of the heat exchanger, and a relative ratio (H1/L) between a length (H1) in which the front guide end may protrude from the end of the front guide part and a distance (L) between the end of the nozzle part and the front guide end may be between 0.25 to 0.55.

The front guide end may be extended from the end of the front guide part in a perpendicular direction, and an end of the front guide end may be in a relatively lower position than the end of the nozzle part along a direction of gravity.

Further, the front guide end may be spaced apart from the front surface of the heat exchanger and be extended in a direction parallel to the front surface of the heat exchanger.

Further, a virtual line extended along an upper surface of the end of the nozzle part may reach a surface of the front guide end.

As described above, the laundry processing apparatus according to the present disclosure has the following effects.

The condensed water generated during operation of a heat pump system in the laundry processing apparatus is used as washing water for the heat exchanger (evaporator). The washing unit of the present disclosure sprays the washing water (the condensed water) in a front direction of the heat exchanger where foreign matter such as lint is collected. Considering the tendency of the washing water to deviate into the heat exchanger, the washing unit guides a direction of the washing water so that the washing water is sprayed forward at a predetermined angle than a front surface of the heat exchanger. Accordingly, the washing water does not flow into the inside of the heat exchanger, and washes to the lower side of the front surface of the heat exchanger evenly, and as a result, the washing efficiency of the washing unit can be improved.

In the present disclosure, the washing direction of the washing water is set by the nozzle part spraying the condensed water and the front guide part facing the nozzle part, with the front surface of the heat exchanger interposed between the nozzle part and the front guide part. The guide end protrudes from at least one of the nozzle part and the front guide part. The guide end can guide the washing water to flow onto the front surface of the evaporator constituting the heat exchanger, thereby minimizing unwashed sections in the heat exchanger.

In the guide end constituting the present disclosure, the nozzle guide end formed at the nozzle part can prevent maximally the sprayed washing water from being sprayed directly toward the front surface of the heat exchanger without passing through the front guide part.

Further, the spray angle (β°) of the washing water and the washing rate associated thereto vary in response to the relative ratio (X/L) between the protruding length (X) of the nozzle guide end and the separate distance (L) between the nozzle guide end and the front guide part. In the present disclosure, as the optimum relative ratio is set, the washing rate can be improved.

Further, in the present disclosure, the spray surface through which the washing water flows is formed in the inclined surface or the curved surface at the upper surface of the nozzle guide end. Since the inclined or curved spray surface can smoothly deliver the washing water toward the front guide part, even when the flow rate of the washing water is reduced, it is possible to prevent the washing water from being sprayed directly toward the front surface of the heat exchanger without passing through the front guide part. Accordingly, even when the amount of the washing water (the condensed water) is not constant, the washing unit can wash the front surface of the heat exchanger evenly and can always provide a high washing rate regardless of a usage pattern of a user.

Further, the nozzle guide end may be formed at the base cover in which the washing unit is installed, and may be formed at a boundary portion between a moving side die and a slide core in a mold for forming the base cover. The boundary portion between the moving side die and the slide core has a parting line, thus the boundary portion is an error-prone portion in the manufacturing process. As the boundary portion is changed into a protruding shape rather than a flat surface or a curved surface, the influence of the error caused during the manufacturing process can be reduced and the product reliability can be increased.

Further, the nozzle guide end constituting the present disclosure includes a plurality of nozzle guide ends, and the falling space which is open along the direction of gravity is provided between the nozzle guide ends, so that part of the washing water can be guided to fall in the direction of gravity to face the front surface of the heat exchanger. The falling space prevents all of the washing water from being sprayed forward of the heat exchanger when the flow rate of the washing water is fast. Accordingly, even when the flow rate of the washing water is not constant, the heat exchanger washing rate above a predetermined level can be maintained.

Further, the nozzle part and the front guide part positioned in the washing unit of the present disclosure can be installed at two components (front cover and rear cover) constituting the base cover, respectively. In this case, a relative distance between the nozzle part and the front guide part may vary depending on manufacturing tolerances or assembly tolerances of the two components. However, in the present disclosure, the nozzle guide end protrudes to extend the flow path toward the front guide part, thus some errors can be compensated. Accordingly, the reliability of the washing operation using the washing unit can be improved.

Further, in the guide ends of the present disclosure, the front guide end formed at the front guide part protrudes in a falling direction of the washing water to guide the sprayed washing water in a perpendicular direction. Whereby, it is possible to maximally prevent the washing water from being directly sprayed toward the front surface of the heat exchanger, and to further reduce the unwashed sections in the heat exchanger.

The spray angle (β°) of the washing water and the washing rate associated thereto vary in response to a relative ratio between the protruding length (H1) of the front guide end and the separate distance (L) between the nozzle guide end and the front guide part. In the present disclosure, as the optimum relative ratio is set, the washing rate can be improved.

Further, in the present disclosure, the nozzle guide end and the front guide end have forms protruding from the nozzle part and the front guide part, so that the nozzle guide end and the front guide end can be molded while using existing forms of the nozzle part and the front guide part. Accordingly, manufacturing facilities for molding the washing unit can have high compatibility and manufacturing can be easy.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
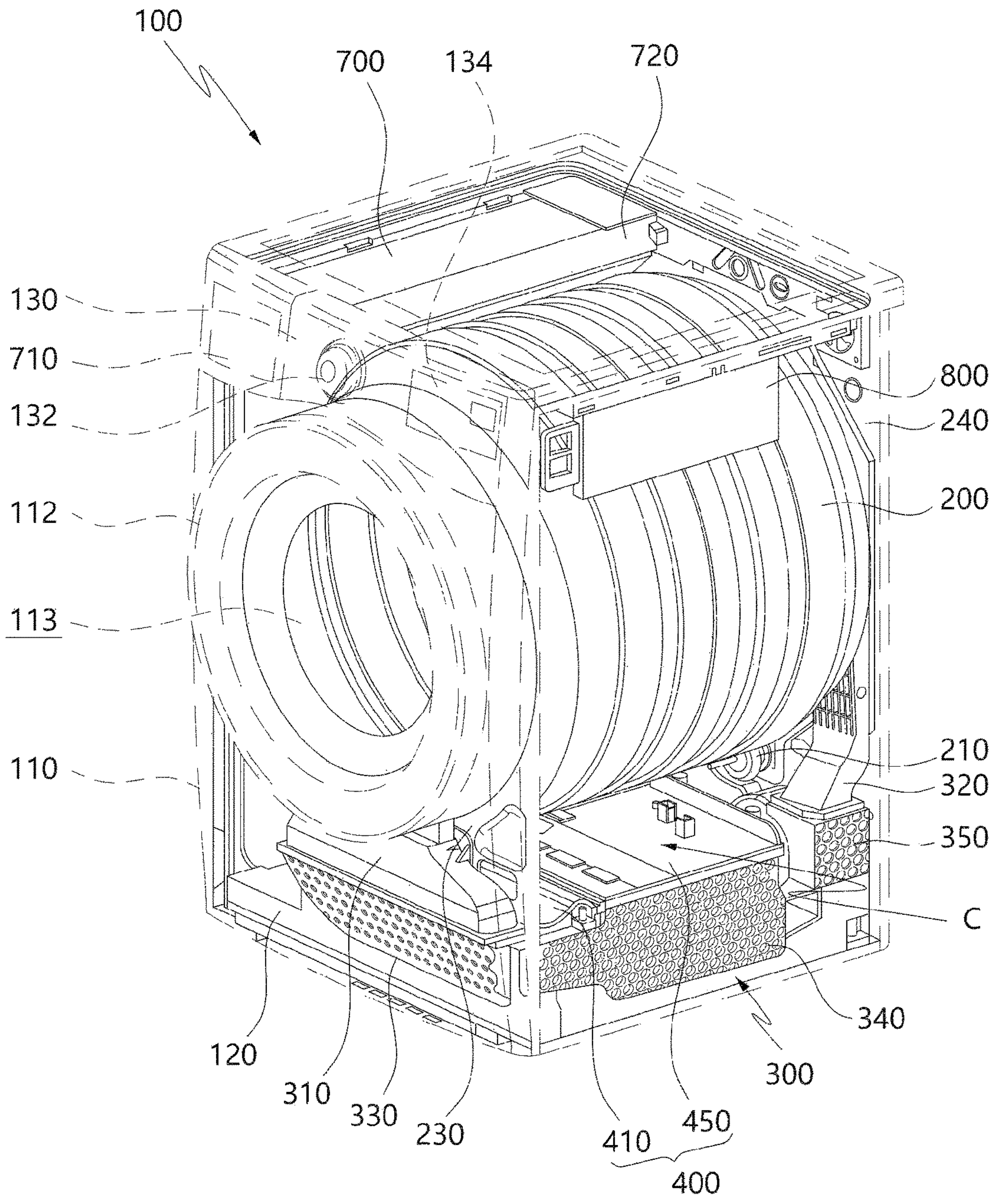
FIG. 1 is a perspective view showing an internal structure of an embodiment of a laundry processing apparatus according to the present disclosure.

Hereinbelow, some embodiments of the present disclosure will be described in detail with reference to exemplary drawings. Like reference numerals are used to identify like elements throughout different drawings. Further, in the following description, when it is decided that the detailed description of known function or configuration related to the invention makes the subject matter of the present disclosure unclear, the detailed description is omitted.

The present disclosure relates to a laundry processing apparatus and includes a heat pump system. The present disclosure is configured to repeat an operation in which high temperature and dry air supplied from the heat pump system performs heat processing for clothing or bed linen to be processed and then humid air containing moisture while drying clothing to be processed is supplied to the heat pump system again and circulated. In the process, foreign matter such as lint is collected in an air inlet part formed in a front surface (362, referring to FIG. 3) of an evaporator 360 that is a heat exchanger constituting the heat pump system. The foreign matter is washed away using condensed water generated during an operational process of the heat pump system. A structure and a method of washing using the condensed water will be described in detail below.

Hereinbelow, a clothing drying machine is described as an example of the laundry processing apparatus, and the present disclosure can be applied to various laundry processing apparatus including the heat pump system, such as a washing machine for drying, a washing machine for both drying and washing, in addition to the clothing drying machine, a refresher for refreshing clothing, and a steamer removing wrinkles of the clothing.

Figure 2:
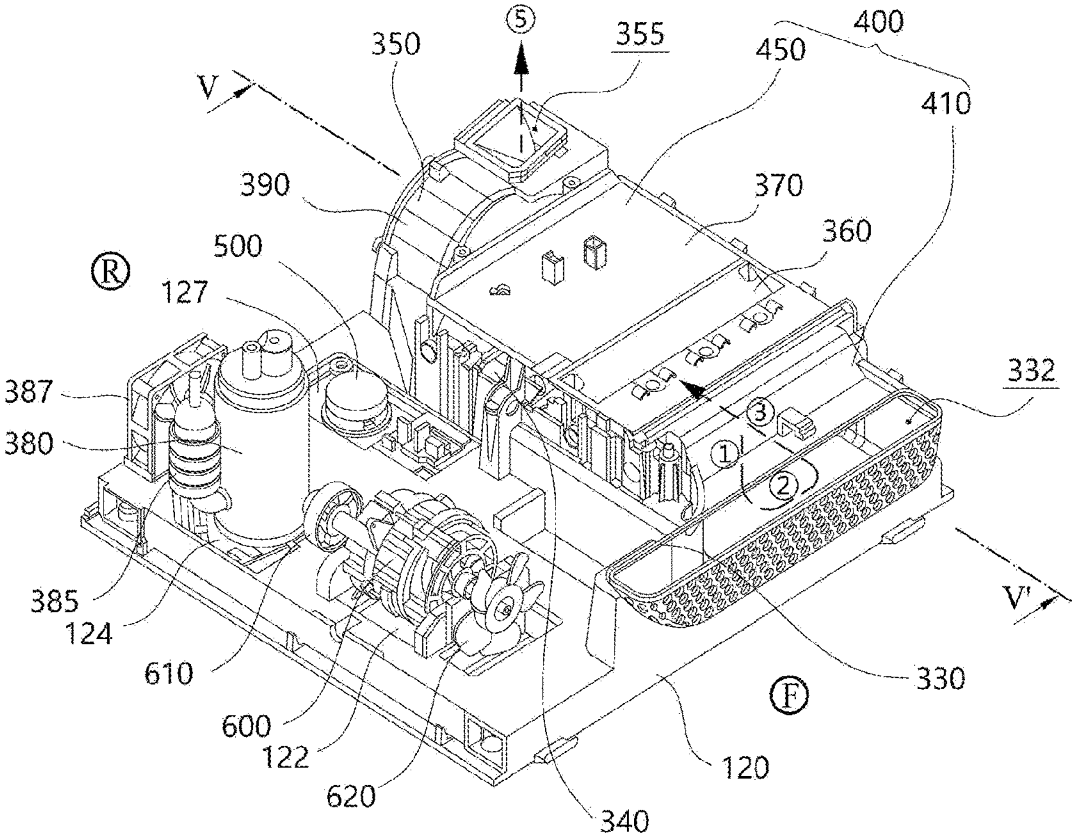
FIG. 2 is a perspective view separately showing a lower structure constituting the embodiment in FIG. 1.
Figure 3:
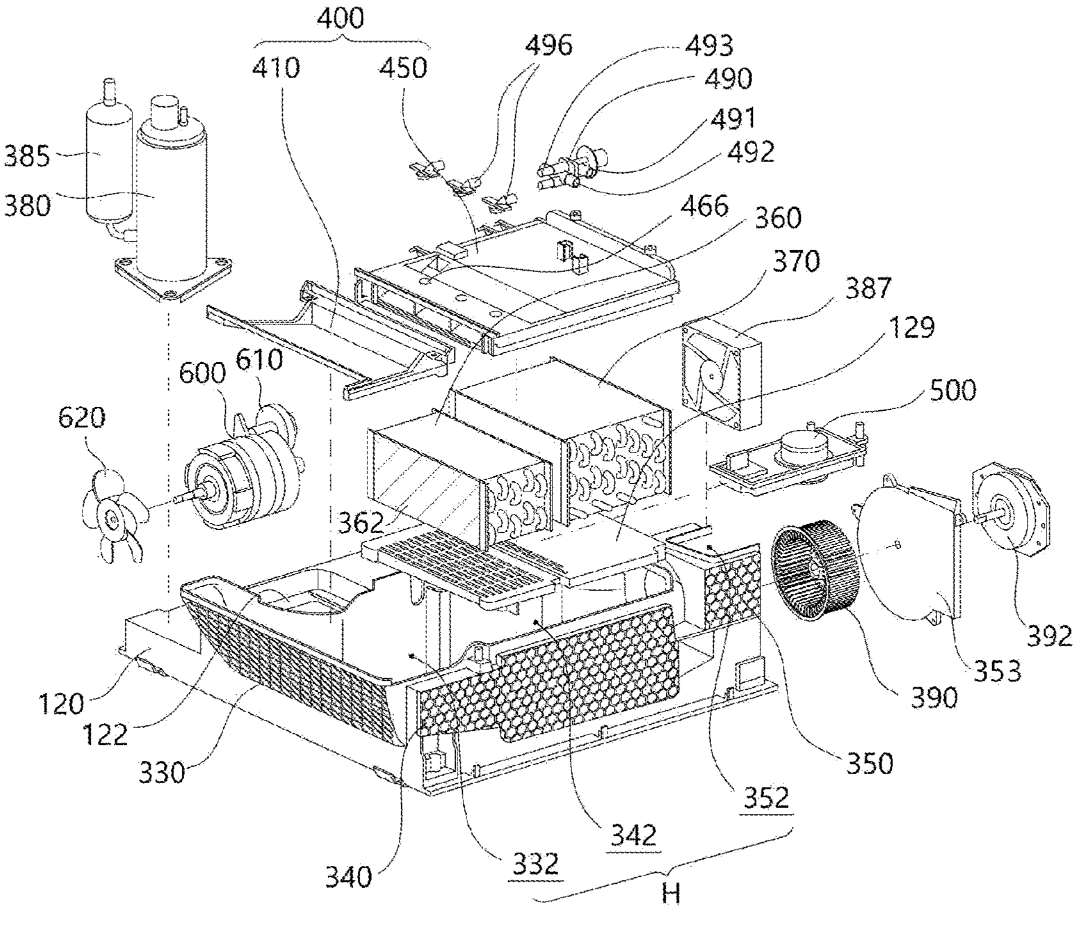
FIG. 3 a perspective view showing an exploded state of the configuration shown in FIG. 2.

FIG. 1 depicts a configuration of the laundry processing apparatus according to an embodiment of the present disclosure and external structures such as a cabinet 110 are indicated by dotted lines for showing an internal structures. FIG. 2 depicts a lower structure including the heat pump system of FIG. 1. FIG. 3 depicts an exploded states of components shown in FIG. 2.

As shown in the drawings, the laundry processing apparatus according to the embodiment of the present disclosure includes the cabinet 110, a drum 200, the heat pump system, a circulation fan 390, the washing unit (C), a drainage tank 700, and a controller 800. In the components, partial components constituting the heat pump system are installed at a lower portion of the laundry processing apparatus while being distributed, and the washing unit (C) constitutes a part of the lower structure and is not needed to be a separate structure.

Describing the components sequentially, the cabinet 110 makes an exterior of the laundry processing apparatus. The cabinet 110 is formed in a container body in which an empty installation space is arranged, and multiple components may be assembled to constitute one cabinet 110, and the installation space may be partitioned into several spaces. In the embodiment, the cabinet 110 is formed of a metal material, but may be formed of various materials including synthetic resin. Further, the cabinet 110 has an exterior shape of an approximately hexahedral structure in the embodiment, but the exterior shape thereof may be variously modified.

The cabinet 110 has a door 112 at a front surface thereof, and an entrance 113 for the clothing to be processed is arranged inside the door 112. The entrance 113 for the clothing to be processed is exposed outward when the door 112 is opened, so that the clothing to be processed may be inserted into an interior space of the drum 200. In the embodiment, at least a part of the door 112 is formed of a transparent or translucent material so that the interior space of the drum 200 is visible. The door 112 is opened and closed using a hinge, but a folding method or a sliding method may be applied thereto.

A lower frame 120 is arranged at a lower portion of the cabinet 110. The lower frame 120 has an approximately square frame shape and is positioned in a bottom side of the installation space of the cabinet 110. Various components including the heat pump system are installed in the lower frame 120. The lower frame 120 provides an installation part in which the various components are installed and allows air after completing heat processing process to flow through an upper space of the lower frame 120.

As shown in FIGS. 2 and 3, the lower frame 120 has a drum motor installation part 122. The drum motor installation part 122 is a space in which a drum motor 600 to be described below is installed and has a downward depressed shape. A compressor installation part 124 is positioned at a position adjacent to the drum motor installation part 122, and a compressor 380 to be described below is installed therein. The drum motor installation part 122 and the compressor installation part 124 are respectively positioned at opposite sides to the heat exchanger and a circulation flow path (H) based on a condensed water collecting part 127.

The lower frame 120 has the condensed water collecting part 127. The condensed water collecting part 127 is connected with the circulation flow path (H), which will be described below, to recover the condensed water generated from the heat exchanger. More precisely, the condensed water that has fallen to a bottom of the circulation flow path (H) is collected in the condensed water collecting part 127. Therefore, the condensed water collecting part 127 has the shape depressed toward the bottom. The condensed water collecting part 127 is provided with a water pump 500 which will be described below. The water pump 500 may deliver the condensed water collected in the condensed water collecting part 127 to the drainage tank 700, and supply the condensed water in the drainage tank 700 to the washing unit (C) side. In FIG. 3, a water cover 129 provided at a bottom of a heat exchange space 342, and the water cover 129 may be omitted when the evaporator 360 that is the heat exchanger and a condenser 370 are spaced apart from the bottom of heat exchange space 342.

Referring to FIG. 1, an input and output panel 130 is installed at a front surface or an upper surface of the laundry processing apparatus. In the embodiment, the input and output panel 130 is installed at a position adjacent to the drainage tank 700. The input and output panel 130 may include an input part 132 through which a user may enter a selection of a clothing processing course and an output part 134 visually displaying operation states of the laundry processing apparatus.

Figure 4:
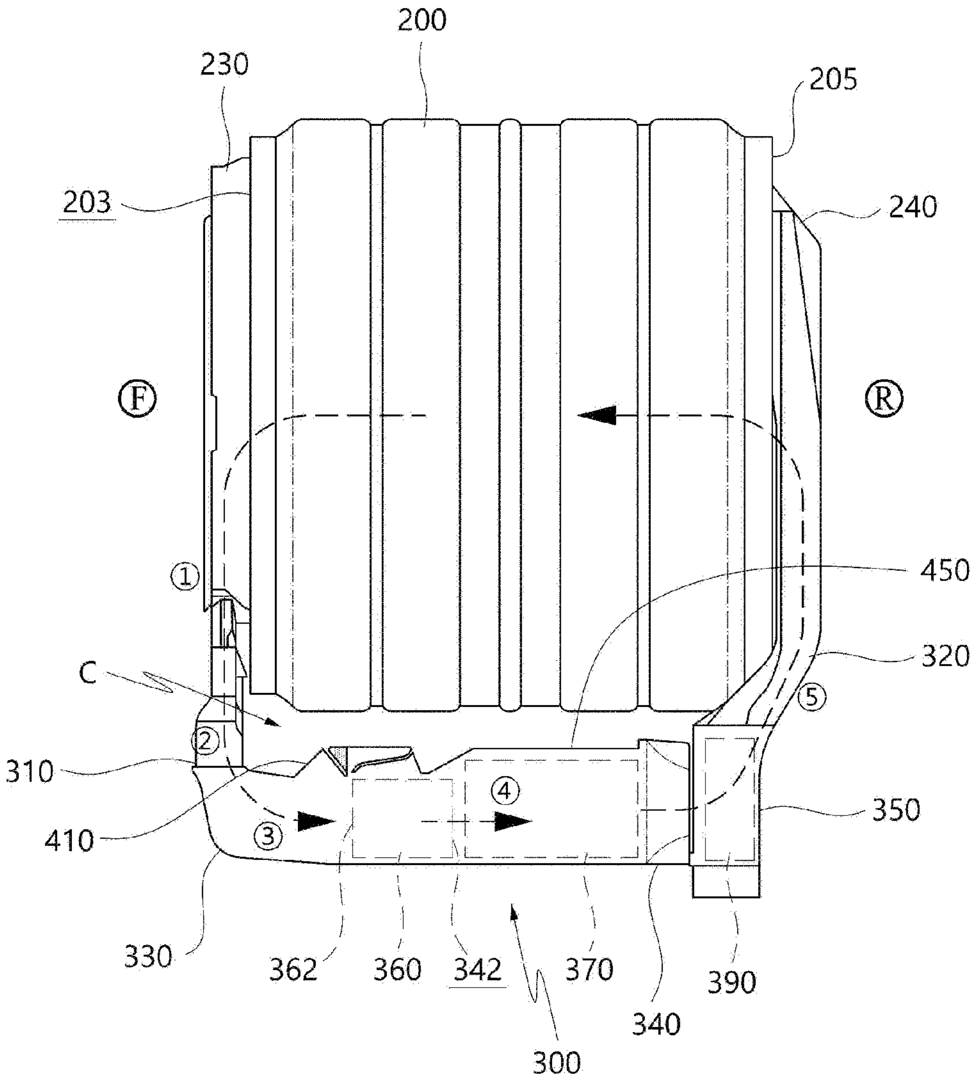
FIG. 4 is a side view showing a drum and partial structures of a lower portion of the drum that constitute the embodiment in FIG. 1.

The drum 200 is installed in the installation space of the cabinet 110 to be rotatable. As shown in FIG. 1, the drum 200 is supported to be rotatable by a roller 210 in the cabinet 110. A plurality of rollers 210 may be installed to be in contact with an outer surface of the drum 200. The drum 200 is formed in a cylindrical body having openings at front and rear surfaces thereof. Referring to FIG. 4, a front opening 203 of the drum 200 communicates with the entrance 113 of the cabinet 110, and a rear opening 205 is positioned at the opposite side of the front opening 203.

High temperature and dry air passes through an inside space of the drum 200 to perform heat processing to the clothing to be processed. The high temperature and dry air is introduced through the rear opening 205 of the drum 200 into the inside of the drum 200 and then is discharged through the front opening 203 of the drum 200 to the outside of the drum 200. In FIG. 4, arrow CD indicates a direction in which the high temperature and high humidity air after performing heat processing (drying) to the clothing to be processed is discharged through the front opening 203 of the drum 200 to the outside of the drum 200.

Referring to FIGS. 1 and 4, a front supporter 230 is provided at a front side where the door 112 is provided and a rear supporter 240 is provided at a rear side, with the drum 200 disposed between front supporter 230 and rear supporter 240. The drum 200 is supported to be rotatable by the front supporter 230 and the rear supporter 240.

A heat exchange module 300 will be described below, the heat exchange module 300 includes the evaporator 360 that is the heat exchanger, the condenser 370, and the circulation fan 390 that are provided in the heat exchange module 300. The heat exchange module 300 covers the above components and further includes components 330, 340, and 350 that form the circulation flow path (H) therein. The heat exchange module 300 is provided at a position corresponding to the opposite side to the compressor installation part 124 and the drum motor installation part 122.

A front duct connector 310 is provided at a side of the heat exchange module 300 adjacent to the front opening 203 of the drum 200. The front duct connector 310 is extended in a vertical direction to connect the front opening 203 of the drum 200 to a heat exchange guide 330 which will be described below. The front duct connector 310 may be an outlet duct 310 since the front duct connector 310 provides a flow path in the drum 200 to discharge the air after performing heat processing for the clothing to be processed.

A rear duct connector 320 is provided at a rear opening 205 of the drum 200, and the rear duct connector 320 is also extended in the vertical direction to allow the high-temperature dry air to be introduced into the drum 200. Therefore, as the rear duct connector 320 forms a flow path introduced into the drum 200, the rear duct connector 320 may be an inlet duct 320. As described above, the front duct connector 310 and the rear duct connector 320 are respectively positioned at the opposite ends of the heat exchange module 300 so that air before/after the heat exchange may be introduced inward and discharged outward.

Figure 5:
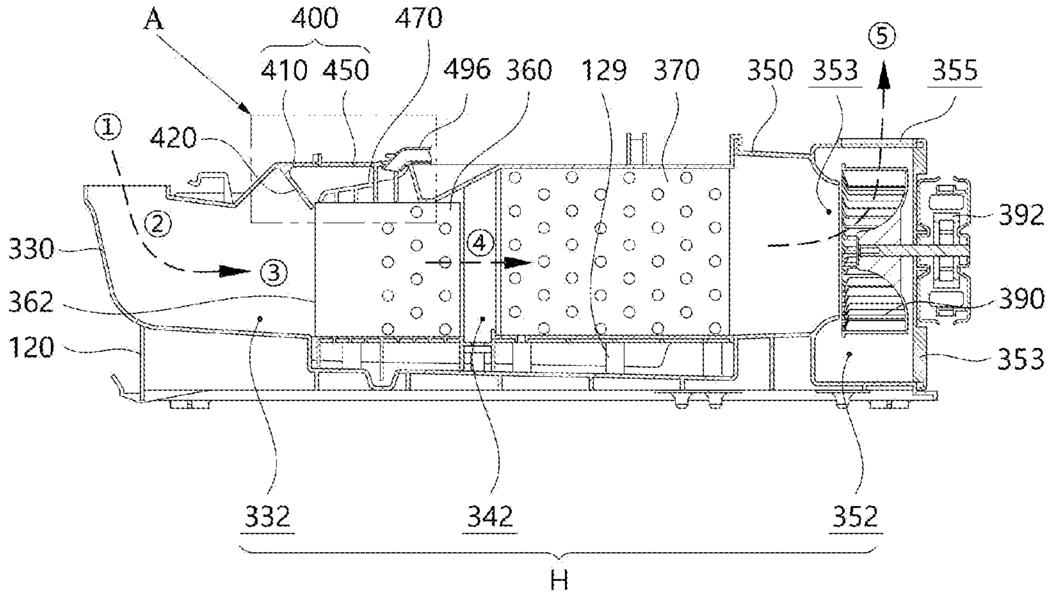
FIG. 5 is a side view taken along V-V' line in FIG. 2.

The high temperature and humidity air after completing the heat processing for the clothing to be processed in the drum 200 is discharged through the front opening 203 (referring to arrow ① in FIG. 4), is delivered through the front duct connector 310 that is the outlet duct 310 (referring to arrow ② in FIG. 4), and then is guided by the heat exchange guide 330 in a direction toward the heat exchanger (referring to arrow ③ in FIG. 4). The heat exchange guide 330 corresponds to a part into which the air delivered through the front duct connector 310 is introduced. A direction of the air is switched toward the rear of the lower frame 120 while the air passes through the heat exchange guide 330 so that the air is introduced into the heat exchange space 342. In FIGS. 4 and 5, arrow @4 indicates a direction in which the heat exchange is performed while the air passes through the heat exchange space 342.

The heat exchange space 342 is a space in which the heat exchanger is installed, and the evaporator 360 removing moisture from the air introduced from the heat exchange guide 330 and the condenser 370 heating the dehydrated air are installed in parallel with each other therein. The heat exchange space 342 may be extended in a linear line from front to rear of the lower frame 120. A side surface of the heat exchange space 342 is surrounded by a partition housing 340 connecting the heat exchange guide 330 to a circulation pan installation part 350 which will be described below. An upper portion of the heat exchange space 342 is covered by a base cover 400 so that the heat exchange space 342 may be cut off from the outside.

Figure 6:
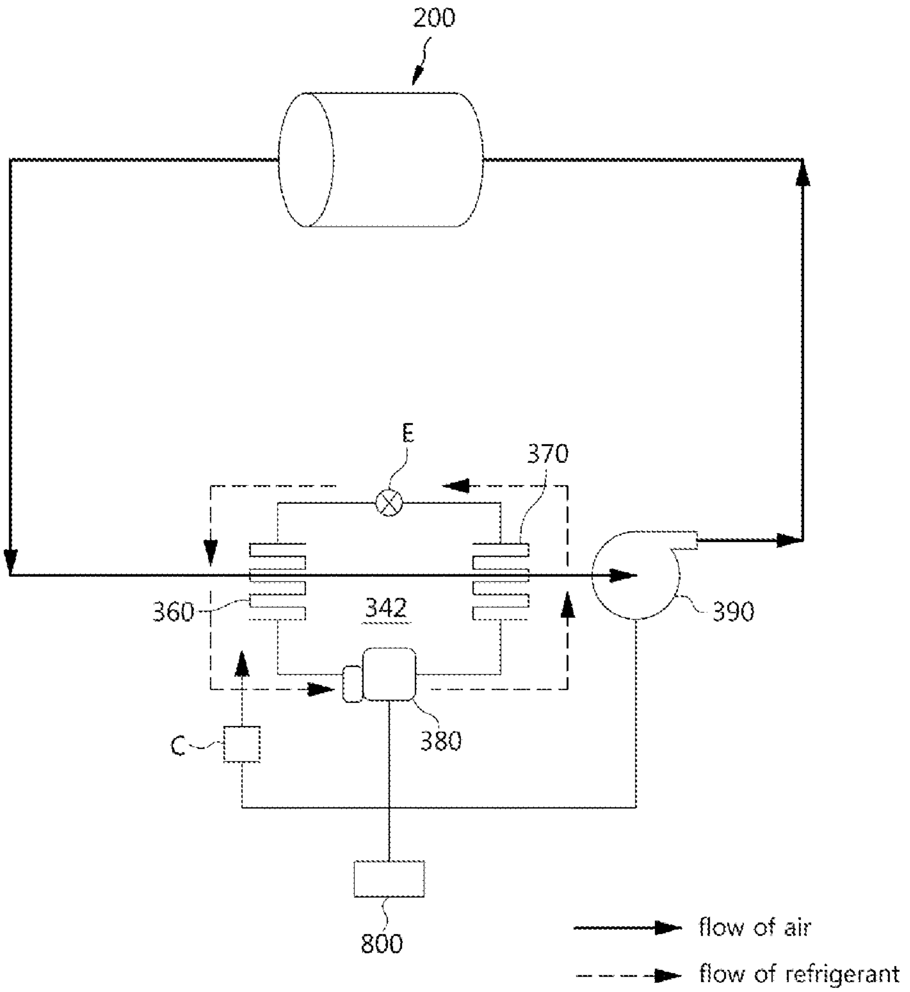
FIG. 6 is a concept view schematically showing a structure for drying operation and washing in the laundry processing apparatus according to the present disclosure.

Referring to FIG. 6, the heat pump system is briefly described below. A cycle is configured to sequentially evaporate, compress, condense, and expand refrigerant. When the heat pump system is operated, air is dried and becomes high temperature while sequentially performing heat exchange with the evaporator 360 and the condenser 370. In detail, the refrigerant compressed in the compressor 380 becomes a high temperature and high pressure state and flows into the condenser 370, and the refrigerant liquefies while discharging heat in the condenser 370. The liquefied high pressure refrigerant is depressurized in an expander (E), the low temperature and low pressure liquid refrigerant flows into the evaporator 360. The refrigerant becomes a low temperature and low pressure gas while evaporating in the evaporator 360.

A process in which air passing through the heat pump system performs the heat exchange will be described below (referring to air flow in FIG. 6). The high temperature and dry air that has passed through the condenser 370 passes through a circulation fan receiving part 352 and then supplies through the rear duct connector 320 to the drum 200 (referring to arrow ⑤ in FIGS. 4 and 5). The high temperature and dry air supplied to the drum 200 evaporates moisture of the clothing to be processed then becomes high temperature and humidity air. The high temperature and humidity air is recovered through the front duct connector 310, and performs the heat exchange with the refrigerant in the evaporator 360 to become low temperature air.

As the temperature of air decreases, the amount of saturation water vapor in the air is recued and moisture contained in the air is condensed. Then, the low temperature dried air performs the heat exchange with the refrigerant in the condenser 370 to become high temperature and dry air and then is supplied to the drum 200 again. In the process, the condensed water is generated and the generated condensed water is collected in the condensed water collecting part 127 described above.

That is, the clothing to be processed in the drum 200 is dried by the high temperature and dry air supplied from the heat pump system by the circulation flow path (H), and the humidity air containing moisture after drying the clothing to be processed is supplied to the heat pump system thereby repeating circulated operation.

As shown in FIG. 3, the circulation flow path (H) is shown in the drawing. The circulation flow path (H) is a flow path through which air is circulated. The circulation flow path (H) includes: a guide space 332 provided in the heat exchange guide 330, the heat exchange space 342 connected to the guide space 332 and provided in the partition housing 340, and the circulation fan receiving part 352 connected to the heat exchange space 342 and receiving the circulation fan 390. The outlet duct 310, the inlet duct 320, and an exhaust port (355, referring to FIGS. 2 and 5) may be seen as part of the circulation flow path (H).

A rear cover 353 is coupled to one side of the circulation fan receiving part 352, and as the rear cover 353 in between, the circulation fan 390 is positioned in the circulation fan receiving part 352 and a fan motor 392 is positioned at the opposite side to the circulation fan 390. The circulation fan 390 suctions air in the heat exchange space 342 and discharges the air to the exhaust port 355 while being rotated by an operational force of the fan motor 392. The circulation fan 390 is installed toward the condenser 370 to suction the air in the heat exchange space 342. That is, the air sequentially passing through the evaporator 360 and the condenser 370 in the circulation flow path (H) by the operation of the circulation fan 390 is supplied through the inlet duct 320 into the drum 200. Air that has performed the heat exchange for the clothing to be processed in the drum 200 circulates in a cycle of passing sequentially through the outlet duct 310, the evaporator 360 and the condenser 370 in the circulation flow path (H).

The compressor installation part 124 described above is equipped with the compressor 380 that generates compressed air for the heat exchange. The compressor 380 is a component constituting the heat pump system, but does not directly perform the heat exchange with air, thus it is unnecessary for the compressor 380 to be installed in the circulation flow path (H). When the compressor 380 is installed in the circulation flow path (H), air flow interferes with the compressor 380, so the compressor 380 may be preferably installed in a position away from the circulation flow path (H). Reference number 385 is a gas-liquid separator, and the gas-liquid separator separates refrigerant flowing into the compressor 380 into gas and liquid so that the gas shaped refrigerant flows into the compressor 380. Reference number 387 is a cooling fan for cooling the compressor 380.

The washing unit (C, referring to indicated portion in FIG. 4) will be described below. The washing unit (C) is installed at a position in the installation space which corresponds to the upper portion of the heat exchanger, and serves to spray the washing water on a front surface 362 of the evaporator 360 for washing, the evaporator 360 being the heat exchanger in which exhaust air flows. The washing water may be the condensed water that is generated during the heat exchange process by the heat pump system or water introduced from the outside. When the condensed water is insufficient to be used as the washing water, the water introduced from the outside may be used as the washing water. In the embodiment, the washing water that is the condensed water passing through the condensed water collecting part 127 and stored in the drainage tank 700 will be described as an example.

First, describing an object washed by the washing unit (C), the washing unit (C) washes the front surface 362 of the evaporator 360 that is the heat exchanger. Herein, the front surface 362 of the evaporator 360 means a surface of the evaporator 360 which face the guide space 332, and is formed in approximately a flat surface as shown in FIG. 5. Foreign matter such as lint and the like is easily collected on the front surface 362 of the evaporator 360, since foreign matter detached from the clothing to be processed is mixed with air heat-processing the clothing to be processed. Of course, it is possible to primarily filter foreign matter by placing a filter module at a position ahead of the evaporator 360 on the circulation flow path (H). However, when the filter module is not provided or part of foreign matter is not filtered by the filter module, foreign matter may be collected on the front surface 362 of the evaporator 360.

The foreign matter may be washed away by the condensed water. The washing rate may vary in response to the flow rate of the flow amount and flow velocity, and in particular, the washing rate may be reduced in response to a direction of spraying the condensed water. Referring to arrow that indicates a discharge path of the condensed water in FIG. 7, the condensed water is sprayed between a nozzle part (S) and a front guide part 420 and has a tendency of deviating to the front surface 362 of the evaporator 360. When the condensed water deviates to the front surface 362 of the evaporator 360, the condensed water may not wash the front surface 362 of the evaporator 360 and may be introduced into the inside of the evaporator 360. That is, the washing is performed only on an upper partial portion of the front surface 362 of the evaporator 360, and the washing rate may be reduced toward a lower portion thereof. The deviation may be attributed to a factor: (i) the condensed water spraying toward a surface of the evaporator 360 flows into the evaporator 360 by a blowing force of air blown toward the evaporator 360 during the operational process of a heat pump; (ii) the surface tension of an outer surface of the evaporator 360 is reduced due to a coating layer treated on the outer surface of the evaporator 360 for waterproofing, so that the condensed water may penetrate into the inside of the evaporator 360; or (iii) the washing water may be introduced into the inside of the evaporator by the Coanda effect in which fluid formed near a surface of an object is attached to the surface of the object by difference in pressure. The washing unit (C) of the present disclosure eliminates the problem.

The washing unit (C) includes the nozzle part (S), the front guide part 420, and the like, and means a group of components that are organically constructed to perform the washing function of the evaporator 360. The components constituting the washing unit (C) may not necessarily perform only the washing function. For example, in the embodiment, the nozzle part (S) and the front guide part 420 are integrally formed into a singly body with the base cover 400. Herein, since the base cover 400 performs a function of covering an upper portion of the circulation flow path (H) to shield the circulation flow path (H), the nozzle part (S) and the front guide part 420 are considered to function as the base cover 400. Alternately, the washing unit (C) may not be installed in the base cover 400, but may be installed in a separate structure. For example, regardless of the base cover 400, the nozzle part (S) and the front guide part 420 constituting the washing unit (C) may be installed by using a separate frame (not shown) that is provided for installing the washing unit (C).

The base cover 400 is assembled to an upper side of the lower frame 120 and is configured to cover and shield the upper portion of the circulation flow path (H). The base cover 400 may be formed of various materials such as synthetic resin, metal, etc., and in the embodiment, the base cover is formed of a synthetic resin material. The base cover 400 is formed approximately in a plate shape and is extended in a longitudinal direction of the circulation flow path (H), i.e., in an air flow direction.

In the embodiment, the base cover 400 includes a front cover 410 and a rear cover 450. The front cover 410 and the rear cover 450 are assembled together to form the one base cover 400, and the front cover 410 and the rear cover 450 are provided as separate objects for convenience of manufacturing, but may be integrally formed into a single body. The front cover 410 is positioned at a side of the guide space 332 and the rear cover 450 relatively deviates to a side of the circulation pan installation part 350. As shown in FIG. 2, the front cover 410 covers a part of the heat exchange space 342 and a part of an upper portion of the guide space 332 and the rear cover 450 covers a remaining part of the heat exchange space 342.

As shown in FIG. 5, the front cover 410 is positioned to deviate toward the guide space 332 than the evaporator 360, and may be configured to cover an upper portion of the evaporator 360 or not to cover the upper portion of the evaporator 360. The front cover 410 has a locking structure for assembly with the rear cover 450, but the locking structure is not shown in the drawings. The front cover 410 and the rear cover 450 may be assembled using a fastener in addition to the locking structure or be connected together by a hinge method.

The front guide part 420 protrudes from a lower surface of the front cover 410. The front guide part 420 is extended from the lower surface of the front cover 410 to be downwardly inclined toward the front surface 362 of the evaporator 360. In the embodiment, the front guide part 420 is formed in a thin plate shape protruding from the lower surface of the front cover 410, but unlike the embodiment, the front guide part 420 may be formed thicker in thickness since an upper surface of the front guide part 420 is a part actually functioning.

The front guide part 420 serves to change a direction of the condensed water sprayed through the nozzle part (S) which will be described below. More precisely, the front guide part 420 is provided at an opposite side of the nozzle part (S) while being spaced apart therefrom, with the front surface 362 of the evaporator 360 interposed between the front guide part 420 and the nozzle part (S), and a protruding end 425 is extended toward the front surface 362 of the evaporator 360. Accordingly, the spray direction of the condensed water discharged from the nozzle part (S) is switched toward the front surface 362 of the evaporator 360.

Figure 7:
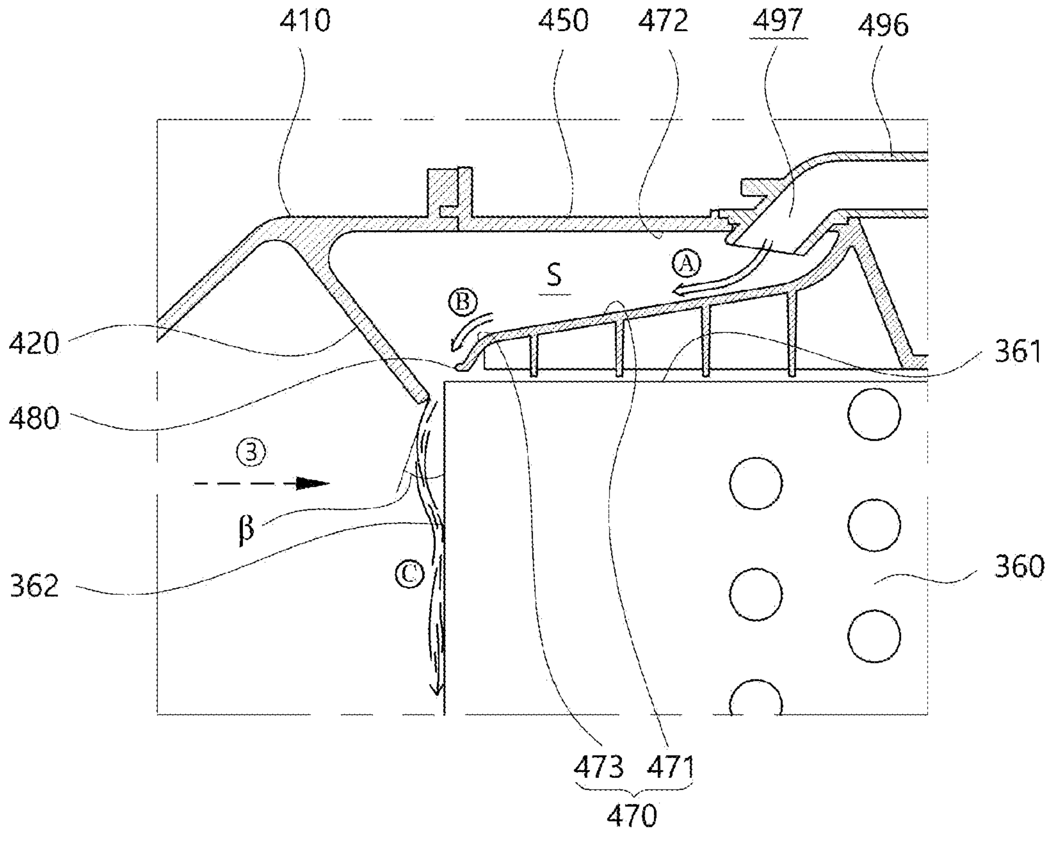
FIG. 7 is a section view showing an enlarged part A in FIG. 5.
Figure 8:
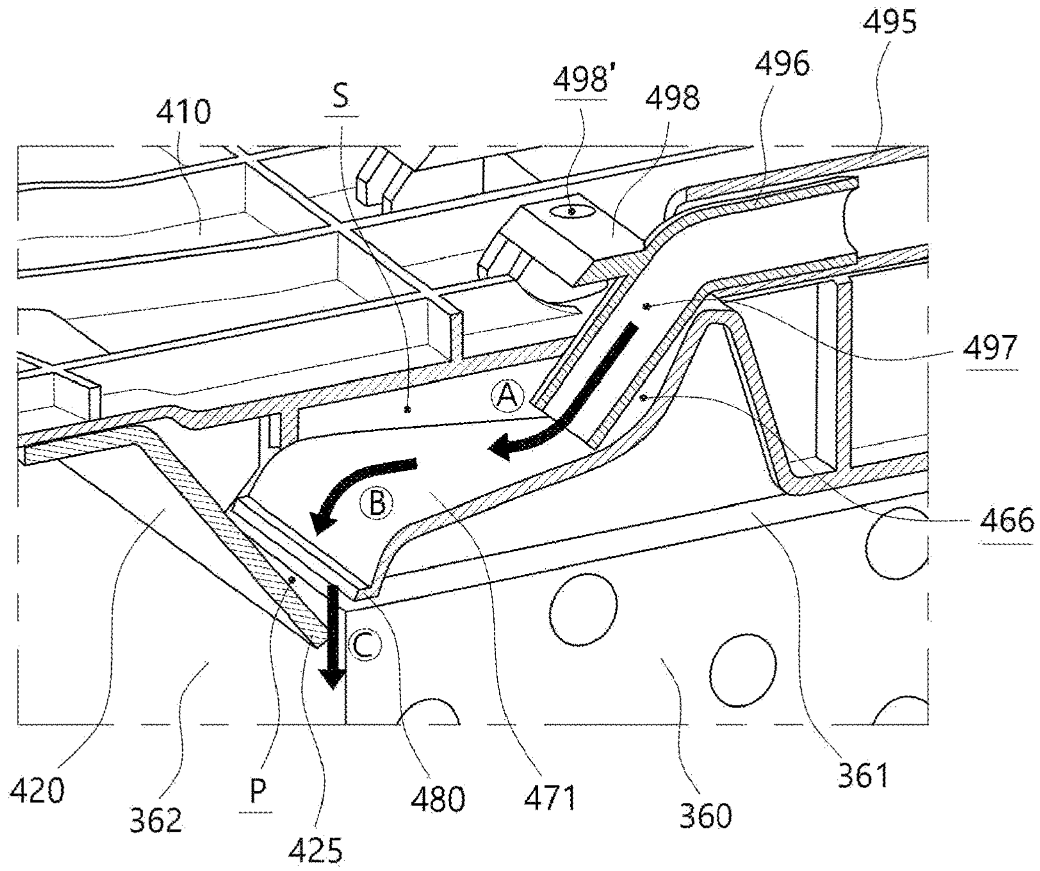
FIG. 8 is a perspective view showing a configuration corresponding to part A in FIG. 5 in a sectional state.
Figure 10:
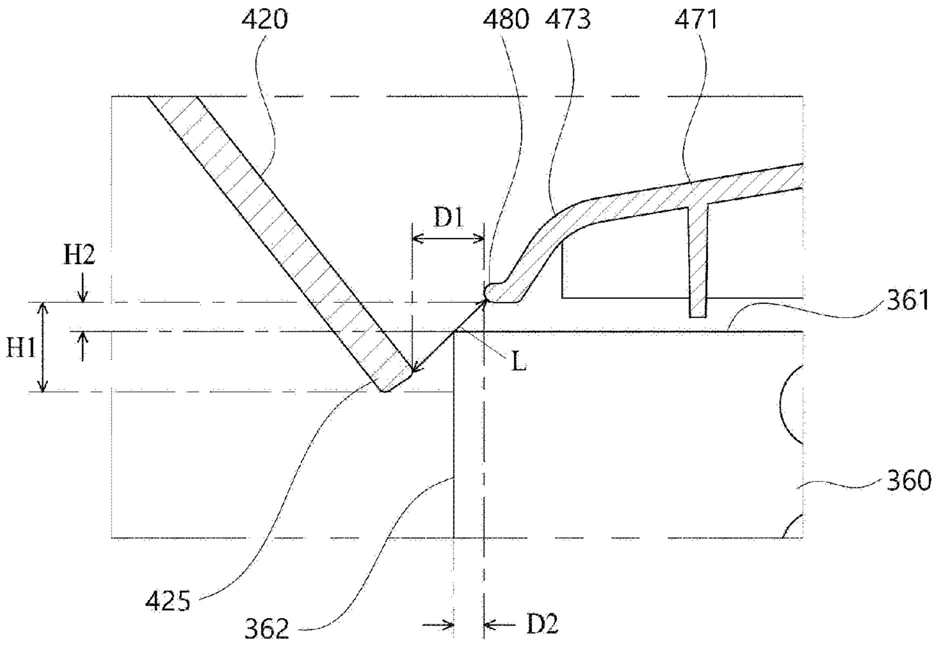
FIG. 10 is an enlarged side view showing a partial structure of a washing unit constituting the embodiment of the laundry processing apparatus according to the present disclosure.

The front guide part 420 is downwardly inclined toward the upper portion of the front surface 362 of the evaporator 360. Referring to FIGS. 7, 8, and 10 showing enlarged part A in FIG. 5, the protruding end 425 of the front guide part 420 is spaced apart from the front surface 362 of the evaporator 360 and is in a position lower than an upper surface 361 of the evaporator 360. When the protruding end 425 of the front guide part 420 is spaced apart from the front surface 362 of the evaporator 360 to a position retracted from the front surface 362 of the evaporator 360, the condensed water sprayed from the nozzle part (S) may be smoothly supplied to the front surface 362 of the evaporator 360 i.e. the heat exchanger. Further, this is because the condensed water may be displayed to the upper surface 361 of the evaporator 360 when the protruding end 425 of the front guide part 420 is higher than the upper surface 361 of the evaporator 360. In the embodiment, the upper surface of the front guide part 420 is a flat surface, but it may be configured by a curved surface or an inclined surface.

Regarding the rear cover 450 to be described below, the rear cover 450 has a plate shaped structure that has a width approximately same as the front cover 410, and is extended from the front cover 410 to cover upper portions of the evaporator 360 and the condenser 370. In the embodiment, the rear cover 450 has a length relatively longer than a length of the front cover 410, and an end of the rear cover opposite to the front cover is connected to the circulation pan installation part 350. A supply flow path of the condensed water is provided along the upper surface of the front cover 410.

The supply flow path means a path supplying the condensed water from the drainage tank 700 to the nozzle part (S), and a part of the supply flow path is installed on an upper surface of the rear cover 450. Referring to FIG. 3, connection holes 466 pass through the upper surface of the rear cover 450, and the connection holes 466 are connected to water tubes 496, respectively. The water tubes 496 are connected to a control valve 490 at the rear of the water tubes through separate connection tubes 495. The separate connection tubes 495 are omitted in FIG. 3, but can be checked in FIGS. 7 and 8. Each of the water tubes 496 has a fixation flange 497, and the water tubes 496 may be fixed to the rear cover 450 by using a fastening hole 498' passing through the fixation flange 498.

At least a part of the water tubes 496 is inserted into the connection holes 466 of the rear cover 450 to be connected to the nozzle part (S). Accordingly, the condensed water is delivered in the order of the drainage tank 700—the control valve 490—the connection tubes 495—the connection holes 466—the nozzle part (S) through the water tubes 496. Of course, the water tubes 496 may be omitted and the drainage tank 700 or external supply means may be directly connected to the connection holes 466.

The control valve 490 is provided for selectively supplying the condensed water to only at least one nozzle part (S) of a plurality of nozzle parts (S), and the control valve 490 may be omitted. In FIG. 3, reference numerals 491 and 492 in the control valve 490 are an input port and an output port, respectively, and reference numeral 493 is a water supply port connected to the water tubes 496. In the embodiment, as three nozzle parts (S) and three water tubes 496 are provided, so three water supply ports 493 are provided.

The nozzle part (S) will be described with reference to FIGS. 7 and 8, the nozzle part (S) has a structure in which a kind of empty space is provided, and the condensed water is sprayed through the nozzle part (S). Each of the nozzle parts (S) has a first side connected to each of the water tubes 496 and a second side opened toward the front surface 362 of the evaporator 360 to discharge the condensed water. At this time, the nozzle part (S) is extended to be inclined downward in a direction of the evaporator 360 thus the condensed water may be sprayed into a discharge channel 473 by gravity with supplied flow rate of the condensed water.

Figure 9:
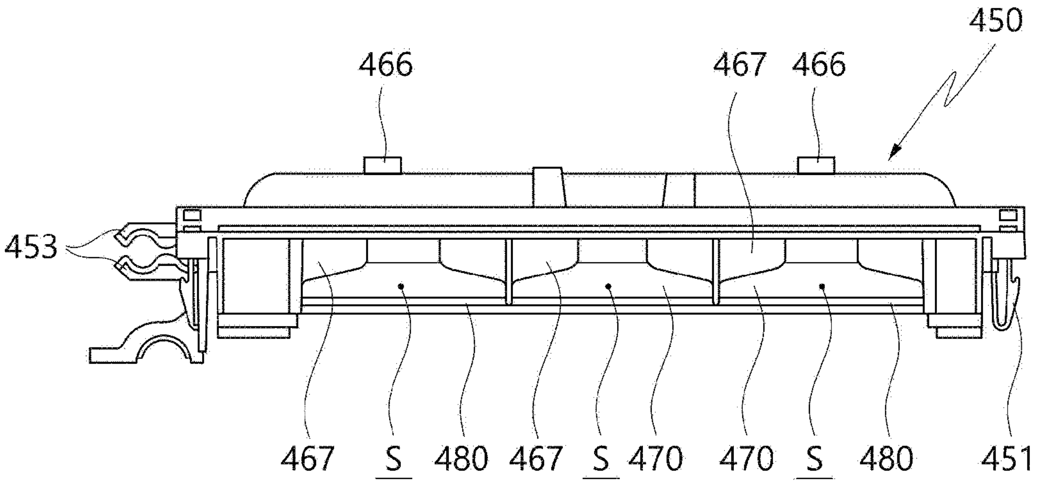
FIG. 9 is a front view a configuration of a rear cover constituting the embodiment of the laundry processing apparatus according to the present disclosure.

The inside of the nozzle part (S) is formed in a flow space as a kind of empty space, the nozzle part (S) is provided between a base 470 that is a bottom surface extended to be downwardly inclined toward the front of the heat exchanger and a cover 472 that is a ceiling surface extended while being spaced upward from the base 470. Each of the compartment vanes 467 connects between the base 470 and the cover 372 to form the sealed nozzle part (S). As shown in FIG. 9, in the embodiment, the three nozzle parts (S) are provided and the nozzle parts (S) are partitioned from each other by the compartment vanes 467. The three nozzle parts (S) are disposed in a left to right width direction of the evaporator 360 in separate sections, respectively, so that the evaporator 360 may be washed evenly. The number of the nozzle part (S) may be changed, and the nozzle parts may communicate with each other to form a single body. Reference numeral 451 (not described) is a hook for assembling the rear cover 450, and reference numeral 453 is a fixation part for fixing a harness.

The base 470 of the nozzle part (S) is configured such that a connection channel 471 and the discharge channel 473 are connected together. The connection channel 471 is extended from an outlet 497 of the water tube 496 and is a portion where a height is gradually lowered toward the front surface 362 of the evaporator 360 in a direction of gravity, i.e., is a relatively gently inclined portion. The discharge channel 473 is a portion extended from the connection channel 471 toward the front of the heat exchanger and has an inclination angle larger than an inclination angle of the connection channel 471. In other words, the discharge channel 473 has a steeper inclination than the connection channel 471. Due to the structure, the condensed water passing through the discharge channel 473 may have a faster flow rate.

The washing unit (C) has a guide end 423 and 480. The guide end 423 and 480 is provided on at least one of the nozzle part (S) or the front guide part 420, and serves to guide a discharge direction of the condensed water toward the front surface 362 of the evaporator 360.

In the embodiment, the guide end 423 and 480 is a nozzle guide end 480 provided in the nozzle part (S), and the nozzle guide end 480 is positioned at an end of the discharge channel 473. The nozzle guide end 480 protrudes from an end of the nozzle part (S) toward the front guide part 420 to guide the discharge direction of the condensed water toward the front guide part 420. The nozzle guide end 480 is shown likely as a protrusion when viewed from a side sectional view as shown in FIG. 7, but is extended in a width direction of the nozzle part (S) as shown in FIG. 8.

An upper surface of the nozzle guide end 480 through which the condensed water flows is extended at a more gradual angle than a downwardly inclination angle at which the nozzle part (S) is inclined toward the outer surface of the heat exchanger, or may be extended in an upwardly inclined direction toward the front guide part 420. As described above, as the angle of the upper surface of the nozzle guide end 480 is generated, the condensed water may not be steeply sprayed in the direction of gravity, but may be guided in a direction of the front guide part 420 along the upper surface of the nozzle guide end 480. In the embodiment, an internal angle ($\alpha$, referring to FIGS. 12A to 12C) between the upper surface of the nozzle guide end 480 and an outer surface of the discharge channel 473 is between 75° to 125°. When the internal angle ($\alpha$) is less than 75°, the flow of condensed water is interrupted, and when the internal angle ($\alpha$) is higher than 125°, the condensed water is not sufficiently delivered toward the front guide part 420.

The nozzle guide end 480 is integrally formed with the end of the discharge channel 473 and is a portion formed during the injection molding of the base cover 400. The nozzle guide end 480 is formed at a boundary portion between a moving side die and a slide core in a mold for forming the base cover 400. That is, the nozzle guide end 480 is formed on a parting line, which is the boundary portion between the moving side die and the slide core where is difficult to perform the precise processing, so it is possible to reduce the influence of errors in the manufacturing process in comparison to the simply forming a continuous outer surface.

Referring to FIG. 10, the nozzle guide end 480 is in a position retracted from the front surface 362 of the evaporator 360 based on a direction in which the condensed water is moved (right to left based on the drawing), and is spaced upward from the upper surface 361 of the evaporator 360. When the nozzle guide end 480 is in a position ahead of the front surface 362 of the evaporator 360, which is the heat exchanger, the condensed water may not be sufficiently sprayed to the front surface 362 of the evaporator 360. Further, the evaporator 360 should be spaced upward from the upper surface 361, so that the condensed water may be sprayed without interference with the evaporator 360.

In addition, the nozzle guide end 480 is preferably positioned at a position relatively higher than the protruding end 425 of the front guide part 420 based on the direction of gravity. The front guide part 420 should guide a spray direction of the condensed water sprayed through the nozzle guide end 480. The embodiment, since the nozzle guide end 480 at the relatively high position supplies the condensed water to the protruding end 425 of the front guide part 420 at a relatively low position, supply of the condensed water may be stable.

A distance (D1) between the protruding end 425 of the front guide part 420 and the nozzle guide end 480, a height difference (H1) between the protruding end 425 of the front guide part 420 and the nozzle guide end 480, a distance (D2) between the nozzle guide end 480 and the front surface 362 of the evaporator 360, and a height difference (H2) between the nozzle guide end 480 and the upper surface 361 of the evaporator 360 are set within predetermined ranges. In the embodiment, (i) the distance (D1) between the protruding end 425 of the front guide part 420 and the nozzle guide end 480 is between 4 mm to 10 mm, (ii) the height difference (H1) between the protruding end 425 of the front guide part 420 and the nozzle guide end 480 is between 3 mm to 9 mm, (iii) the distance (D2) between the nozzle guide end 480 and the front surface 362 of the evaporator 360 is between 2.0 mm to 5.0 mm, and (iv) the height difference (H2) between the nozzle guide end 480 and the upper surface 361 of the evaporator 360 is between 1.5 mm to 4.5 mm. Of course, the above ranges may be changed somewhat in response to the flow rate of the condensed water and the amount of washing.

As described above, in a condition when the distance (D2) in which the nozzle guide end 480 is retracted from the front surface 362 of the evaporator 360 is between 2.0 mm to 5.0 mm and the height (H2) in which the nozzle guide end 480 is spaced upward from the upper surface 361 of the evaporator 360 is between 1.5 mm to 4.5 mm, a length (X) in which the nozzle guide end 480 protrudes toward the front guide part 420 is between 0.3 mm to 1.1 mm. The degree to which the nozzle guide end 480 protrudes affects a spray angle (β, referring to FIG. 7) in which the condensed water is sprayed. The spray angle (β) is an angle formed between the sprayed condensed water and the front surface 362 of the evaporator 360. When the spray angle (β) is small, the condensed water flows while deviating to the evaporator 360 thus the washing function of the condensed water may not properly performed. On the contrary, when the spray angle (β) is too large, the condensed water is sprayed in a direction away from the front surface 362 of the evaporator 360 thus the evaporator 360 may not be washed. That is, the condensed water discharged from the washing unit (C) is discharged between the nozzle guide end 480 and the front guide part 420 (P, referring to FIG. 8), and it is preferable that the condensed water falls while having the predetermined spray angle (β) in a direction away from the front surface 362 of the evaporator 360 based on the direction of gravity.

Meanwhile, when a separate distance (L, referring to FIG. 10) between the nozzle guide end 480 and the front guide part 420 and the protruding length (X) of the nozzle guide end 480 vary, a value of the spray angle (β) is as follows. Row 1 in table 1 below shows a ratio (X/L) of dividing the protruding length (X) of the nozzle guide end 480 by the separate distance (L) between the nozzle guide end 480 and the front guide part 420, and the test was conducted three times. For reference, a value between 4 mm to 9 mm was tested as the separate distance (L) between the nozzle guide end 480 and the front guide part 420 and a value between 0.1 mm to 1.8 mm was tested as the protruding length (X) of the nozzle guide end 480.

TABLE 1

| X/L | 0.02 | 0.04 | 0.07 | 0.10 | 0.12 | 0.15 | 0.19 | 0.21 | 0.25 | 0.30 |
|---|---|---|---|---|---|---|---|---|---|---|
| 1 | 1 | 5 | 7 | 10.5 | 7 | 11 | 21 | 25 | 23 | 26 |
| 2 | 1.4 | 8 | 5 | 9 | 9.5 | 12 | 25 | 21 | 27 | 22 |
| 3 | 1.2 | 6 | 9 | 11 | 7 | 8 | 22 | 24 | 21 | 24 |

Figure 11:
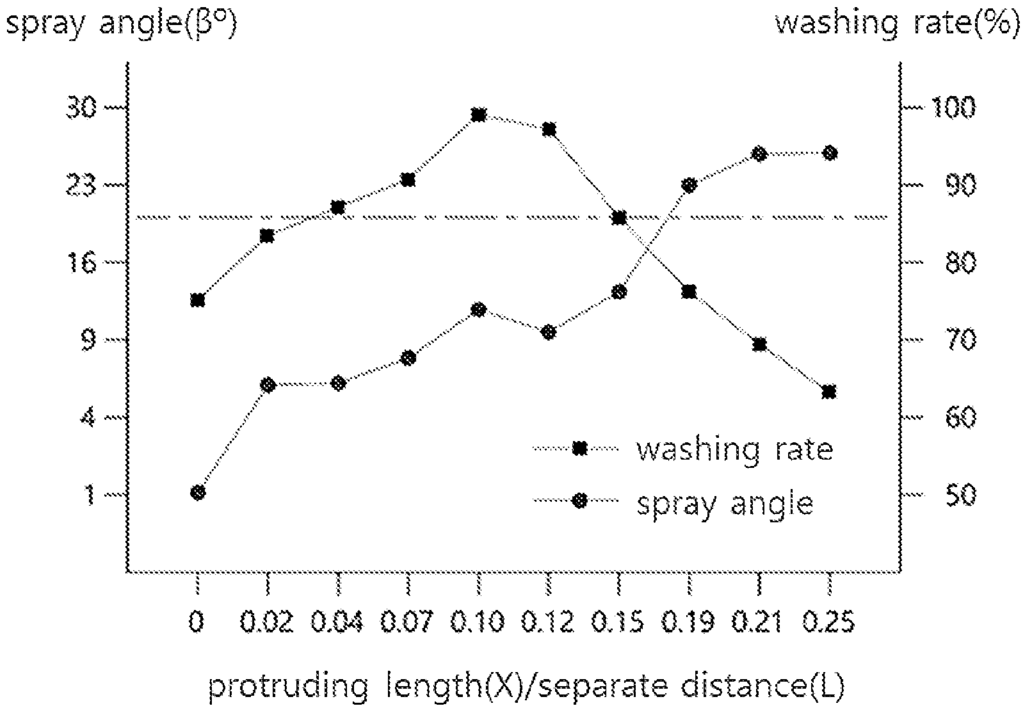
FIG. 11 is a graph showing variations of a spray angle and a washing rate in response to a length of a nozzle guide end that constitutes the embodiment of the laundry processing apparatus according to the present disclosure.

Results of calculating the washing rate in each case are shown in a graph in FIG. 11. FIG. 11 is the graph showing the variations of the spray angle (β) and the washing rate in response to the protruding length (X) of the nozzle guide end 480. That is, the graph shows that when the ratio (X/L) of dividing the protruding length (X) of the nozzle guide end 480 by the separate distance (L) between the nozzle guide end 480 and the front guide part 420 vary, how the spray angle (β) of the sprayed condensed water varies and how the washing rate varies in response to the spray angle (β).

As shown in the graph in FIG. 11, as the ratio (X/L) of dividing the protruding length (X) of the nozzle guide end 480 by the separate distance (L) between the nozzle guide end 480 and the front guide part 420 is increased, the spray angle (β) is gradually increased. This means that when the nozzle guide end 480 relatively further protrudes, the condensed water sprayed through the nozzle part (S) is guided forward along the nozzle guide end 480 thereby increasing the spray angle (β). Further, when the ratio (X/L) becomes 0.19 or more, the increase of the spray angle (β) is reduced and converges to about 30°. This means that the spray angle (β) may not be increased higher than a predetermined level due to the front guide part 420 facing the nozzle guide end 480.

Meanwhile, in the graph, as the ratio (X/L) of dividing the protruding length (X) of the nozzle guide end 480 by the separate distance (L) between the nozzle guide end 480 and the front guide part 420 is increased higher than a predetermined level, the washing rate is increased and then reduced. For reference, the washing rate is obtained by measuring the amount of foreign matter remaining after spraying the condensed water for about 30 seconds on the front surface 362 of the evaporator 360 on which foreign matter is widely spread. Therefore, the high washing rate means that the amount of foreign matter remaining after washing is small. As shown in the graph, when the ratio (X/L) is 0.02, the washing rate is about 70%, and when the ratio (X/L) is 0.04, the washing rate is higher than about 80%. The washing rate which is continuously increased along the ratio (X/L) is reduced from a starting point when the ration (X/L) is 0.12, and the washing rate is about 75% when the ration (X/L) is 0.19. The washing rate should be high in order not to decrease the efficiency of the heat pump system, so it is preferable that the ratio (X/L) is between 0.04 to 0.15 in order to maintain the washing rate at about 90% or more. At this time, the spray angle is between 5° to 15°.

An inclined or curved spray surface 482 that is inclined downward in the direction of gravity is formed at an upper surface of the nozzle guide end 480. The spray surface 482 corresponds to the upper surface of the nozzle guide end 480 where the condensed water is finally guided, and the spray surface 482 allows the condensed water to be delivered more smoothly toward the front guide part 420.

Figure 12A:
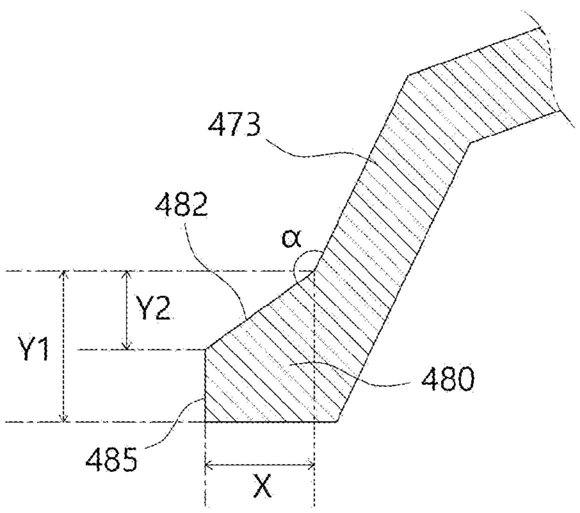
FIGS. 12A to 12C are side views showing various embodiments of the nozzle guide end that constitutes the embodiment of the laundry processing apparatus according to the present disclosure.
Figure 12B:
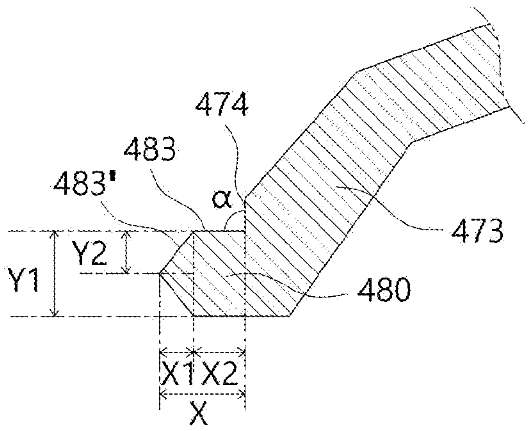
Figure 12C:
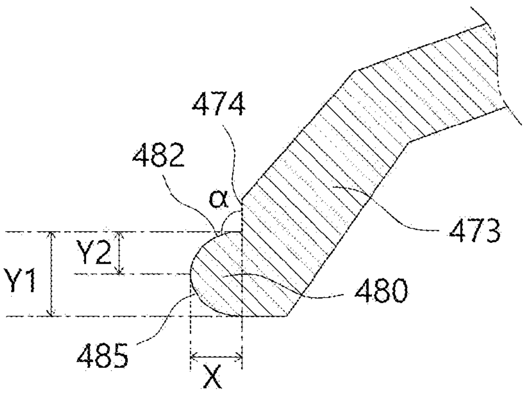

FIGS. 12A to 12C depict views showing various embodiments of the nozzle guide end 480 different from each other. In the nozzle guide end 480 in FIG. 12A, the spray surface 482 is extended while having a gradual slope than a slope of the discharge channel 473 of the nozzle part (S). That is, an internal angle (α) formed between the spray surface 482 of the nozzle guide end 480 and an outer surface of the discharge channel 473 is less than 1250 and servers to make the discharge channel 473 more gradual. Herein, a thickness (Y2) of the spray surface 482 is smaller than a thickness (Y1) of the nozzle guide end 480, and in the embodiment, the thickness (Y2) of the spray surface 482 is equal to or greater than ½ of the total thickness (Y1) of the nozzle guide end 480. Therefore, a length of the spray surface 482 may be sufficiently secured.

In the nozzle guide end 480 in FIG. 12B, the spray surface 482 is extended with a gradual slope than the slope of the discharge channel 473 of the nozzle part (S). The spray surface 482 is divided into two portions that are a first inclined surface 483 and a second inclined surface 483'. The first inclined surface 483 is a portion protruding from the discharge channel 473 of the nozzle part (S). The second inclined surface 483' is a portion protruding from the first inclined surface 483 and extended in a downward inclined direction toward the front of the heat exchanger than the first inclined surface 483 and a portion where an inclination angle become steep again.

The first inclined surface 483 guides the condensed water passing through the discharge channel 473 to flow smoothly toward the front guide part 420, and the second inclined surface 483' serves the same function as the first inclined surface 483 and reduces a front area of the nozzle guide end 480. Herein an end of the nozzle guide end 480 does not have a flat surface, but has a sharp linear shape or a flat surface with a very low height, so that the condensed water flowing downward along a front surface of the nozzle guide end 480 may be minimized. In the embodiment, the protruding length of the nozzle guide end 480 is between 0.5 mm to 0.9 mm, and a height (Y2) of the spray surface 482 formed by the first inclined surface 483 and the second inclined surface 483' is equal to or greater than ½ of the total thickness (Y1) of the nozzle guide end 480.

Meanwhile, the discharge channel 473 is connected with a steeply inclined surface 474. The steeply inclined surface 474 is a portion positioned between the discharge channel 473 and the nozzle guide end 480 and is extended with an inclination angle greater than an inclination angle of the discharge channel 473. The steeply inclined surface 474 provides a steep slope to guide the flow rate of the condensed water to flow faster. As the condensed water having the increased flow rate is delivered toward the front guide part 420 while passing through the spray surface 482, even when the flow amount of the condensed water is small and the flow rate thereof is low, the condensed water may not flow directly toward the evaporator 360. In the embodiment, an internal angle (α) between the steeply inclined surface 474 and the first inclined surface 483 is between about 88° to 95°.

Finally, in the nozzle guide end 480 in FIG. 12C, the spray surface 482 has a curved shape. As shown in the side section view of the spray surface 482, the nozzle guide end 480 has an approximately semicircular, and thus the spray surface 482 is entirely formed in the curved surface. Of course, a lower side surface 485 of the nozzle guide end 480 may have a non-curved surface and only a partial upper side thereof may be formed in the curved spray surface 482. In the embodiment, the thickness (Y2) of the spray surface 482 is equal to or greater than ½ of the total thickness (Y1) of the nozzle guide end 480. For reference, in the embodiment, although the spray surface 482 is not clearly distinguished, an upper side of the nozzle guide end 480 centered on a most protruding portion toward the front guide part 420 may refer to the spray surface 482. In the embodiment, the protruding length (X) of the nozzle guide end 480 is between 0.5 mm to 0.9 mm.

Figure 13:
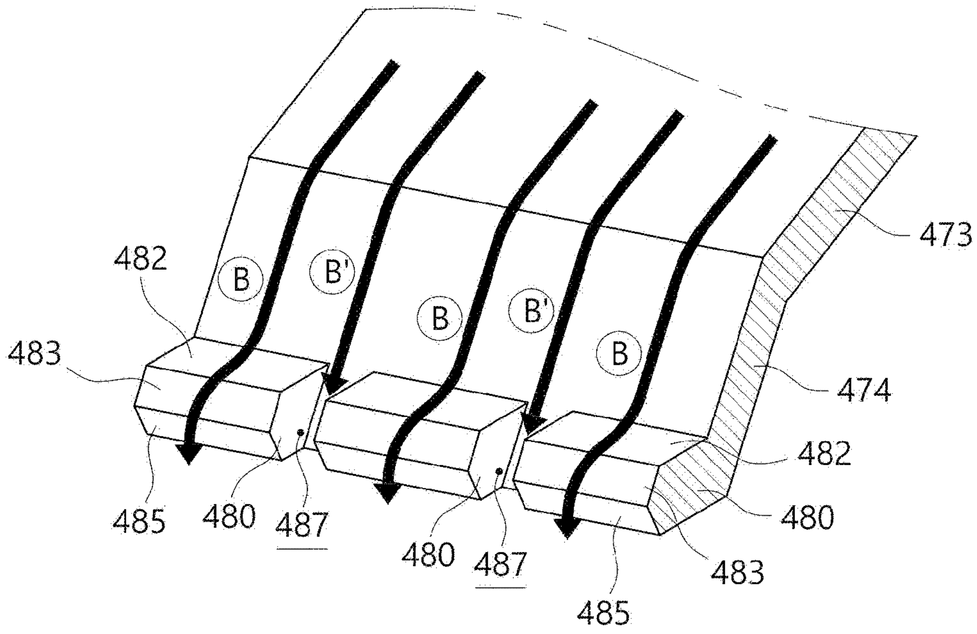
FIG. 13 is a perspective view showing other embodiment of the nozzle guide end that constitutes the embodiment of the laundry processing apparatus according to the present disclosure.

Meanwhile, FIG. 13 depicts other embodiment of the nozzle guide end 480. As shown in the drawing, the discharge channel 473 of the nozzle part (S) is connected with the steeply inclined surface 474 and the nozzle guide end 480 is positioned at end of the steeply inclined surface 474. The nozzle guide end 480 is not connected continuously, but is arranged in a separate form. That is, a plurality of nozzle guide ends 480 which are spaced apart from each other is arranged in a left to right width direction of the discharge channel 47, and a falling space 487 which is open along the direction of gravity is provided between the nozzle guide ends 480.

The falling space 487 penetrates the nozzle guide end 480 in a vertical direction to provide a path for the condensed water to fall. As shown in FIG. 13, a portion of the condensed water delivered through the nozzle part (S) to the nozzle guide end 480 is moved along the spray surface 482 toward the front guide part 420, and the remaining thereof may fall through the falling space 487 downward. That is, as the falling space 487 which is open along the direction of gravity is provided at the nozzle guide end 480, some of the condensed water is guided to fall in the direction of gravity to direct the front surface of the heat exchanger. The falling space 487 prevents all the condensed water from being sprayed away in front of the heat exchanger when the flow rate of the condensed water is fast. Accordingly, even when the amount and the flow rate of the condensed water are large or small, it is possible to stably spray more than a predetermined level of the condensed water.

Although not shown in the drawing, a length (X1) in which the nozzle guide end 480 protrudes toward the front guide part 420 or the thickness (Y1) of the nozzle guide end 480 may be formed different from each other along a left to right width direction of the nozzle part (S). In this way, the condensed water with the amount and flow rate of a wide range may be supplied to the front guide part 420 above the predetermined level.

As shown in FIGS. 2 and 3, the water pump 500 is installed in the installation space of the cabinet 110. The water pump 500 is installed in the condensed water collecting part 127 to move the condensed water flowing into the condensed water collecting part 127 to the drainage tank 700. When the condensed water is stored in the drainage tank 700 by the water pump 500, the stored condensed water may be used as the washing water or may be discharged outward.

The drum motor 600 which generates a driving force for rotation of the drum 200 is installed in the drum motor installation part 122. A belt (not shown) may be connected to the drum motor 600 to deliver the driving force of the drum motor 600 to the drum 200, and the belt may be arranged to surround an outer circumference of the drum 200. A pulley 610 and a spring (not shown) may be used to control tension applied to the belt.

A blowing fan 620 may be mounted to a shaft of the drum motor 600. In the embodiment, the belt may be connected to one side of the drum motor 600 and the blowing fan 620 may be mounted to the other side thereof. Accordingly, shafts respectively provided at the both sides of the drum motor 600 may rotate the drum 200 and the blowing fan 620 while being rotated in the same direction and at the same speed.

As shown in FIG. 1, the drainage tank 700 is installed at an upper side of the cabinet 110. The drainage tank 700 may be disposed a left upper portion or a right upper portion of the drum 200. FIG. 1 depicts the drainage tank 700 installed at the left upper portion of the drum 200. A drainage cover 710 is disposed at a left upper end or a right upper end in a front surface of the laundry processing apparatus to correspond to a position of the drainage tank 700. The drainage cover 710 is formed to be gripped by hand and exposed to the front surface of the laundry processing apparatus. When the drainage cover 710 is pulled in order to empty the condensed water collected in the drainage tank 700, the drainage tank 700 is withdrawn from a water tank support frame 720 together with the drainage cover 710.

Meanwhile, the controller 800 is installed in the laundry processing apparatus. The controller 800 is configured to control the operation of the laundry processing apparatus on the basis of a user input applied through the input part 132. The controller 800 may consist of a circuit board and devices mounted on the circuit board. When the user selects a laundry processing course through the input part 132, the controller 800 controls the operation of the laundry processing apparatus according to a preset algorithm.

Hereinafter, a process of washing the evaporator 360 by using the washing unit (C) constituting the present disclosure will be described. In a process of generating the condensed water, high temperature and dry air passing through the condenser 370 of the heat pump system passes through the circulation fan receiving part 352 and then is supplied to the drum 200 through the rear duct connector 320. The high temperature and dry air supplied to the drum 200 evaporates moisture of the clothing to be processed and becomes high temperature and humidity air. The high temperature and humidity air is recovered through the front duct connector 310 and heat-exchanges with refrigerant in the evaporator 360 to become low temperature air, and as the temperature of the air is reduced, the amount of saturation water vapor in the air is reduced, so that the moisture contained the air is condensed. In the process, the condensed water is generated and the generated condensed water is collected in the condensed water collecting part 127 described above. The water pump 500 delivers the condensed water collected in the condensed water collecting part 127 to the drainage tank 700 to store the condensed water.

The condensed water may be supplied to the washing unit (C) when the laundry processing apparatus is in operation or stopped, thereby performing a washing process. In the washing process, the condensed water stored in the drainage tank 700 is delivered to the control valve 490 by the water pump 500 and the control valve 490 delivers the condensed water to the water tubes 496 through a connection tube 295.

The condensed water is introduced into the nozzle part (S) through the outlet 497 of the water tubes 496 (referring to arrow A in FIGS. 7 and 8) and flows through the base 470 corresponding to a bottom of the nozzle part (S). The base 470 is configured such that the connection channel 471 and the discharge channel 473 are connected to each other. The connection channel 471 is a portion in which a height thereof is gradually lowered along the direction of gravity toward the front surface 362 of the evaporator 360 and a portion with a relatively gradual slope, thereby allowing the condensed water to flow. Since the discharge channel 473 has a steeper slope than the slope of the connection channel 471, the condensed water passing through the discharge channel 473 may obtain a faster flow rate (referring to arrow B in FIGS. 7 and 8) The condensed water passing through the discharge channel 473 is sprayed toward the front guide part 420 through the nozzle guide end 480. In the embodiment, since the nozzle guide end 480 at a relatively high position supplies the condensed water to the protruding end 425 of the front guide part 420 at the relatively low position, the condensed water may be stably delivered. Herein, as described above, the length of the nozzle guide end 480 is between 0.3 mm to 1.1 mm and the spray angle (β) generated through the length is between 5° to 15°. Due to the spray angle (β), as shown in FIG. 7, the condensed water is guided in the direction away from the front surface 362 of the evaporator 360 and then is delivered toward the front surface 362 of the evaporator 360 in a downward flow process (referring to arrow C in FIGS. 7 and 8). Accordingly, the condensed water is not directly guided to the inside of the evaporator 360 but flows evenly along the front surface 362 of the evaporator 360, thereby sufficiently performing the washing function.

In particular, during the operation of the laundry processing apparatus, the high temperature and humidity air after performing heat processing on the clothing to be processed in the drum 200 is moved in a direction of arrow ③ in FIG. 7. In the process, the condensed water may be pushed toward the front surface 362 of the evaporator 360. However, in the embodiment, since the spray angle (β) is set between 5° to 15°, the condensed water falls downward while overcoming the force to some degree. Accordingly, the washing may be performed to a lower portion of the front surface 362 of the evaporator 360.

Hereinafter, referring to FIGS. 14 to 17, a second embodiment of the present disclosure will be described. For reference, descriptions of the same structures as in the previous embodiment will be omitted, and different structures from the previous embodiment will be described.

The washing unit (C) has the guide end 423 and 480. The guide end 423 and 480 is provided on at least one of the nozzle part (S) and the front guide part 420, and the guide end 423 and 480 serves to guide the discharge direction of the condensed water toward the front surface 362 of the evaporator 360.

In the embodiment, the guide end 423 and 480 is a front guide end 423 provided at the front guide part 420. The front guide end 423 is a portion on which the condensed water sprayed from the nozzle part (S) touches, and the condensed water hits the front guide end 423 and then may be guided toward the front surface 362 of the evaporator 360.

Figure 14:
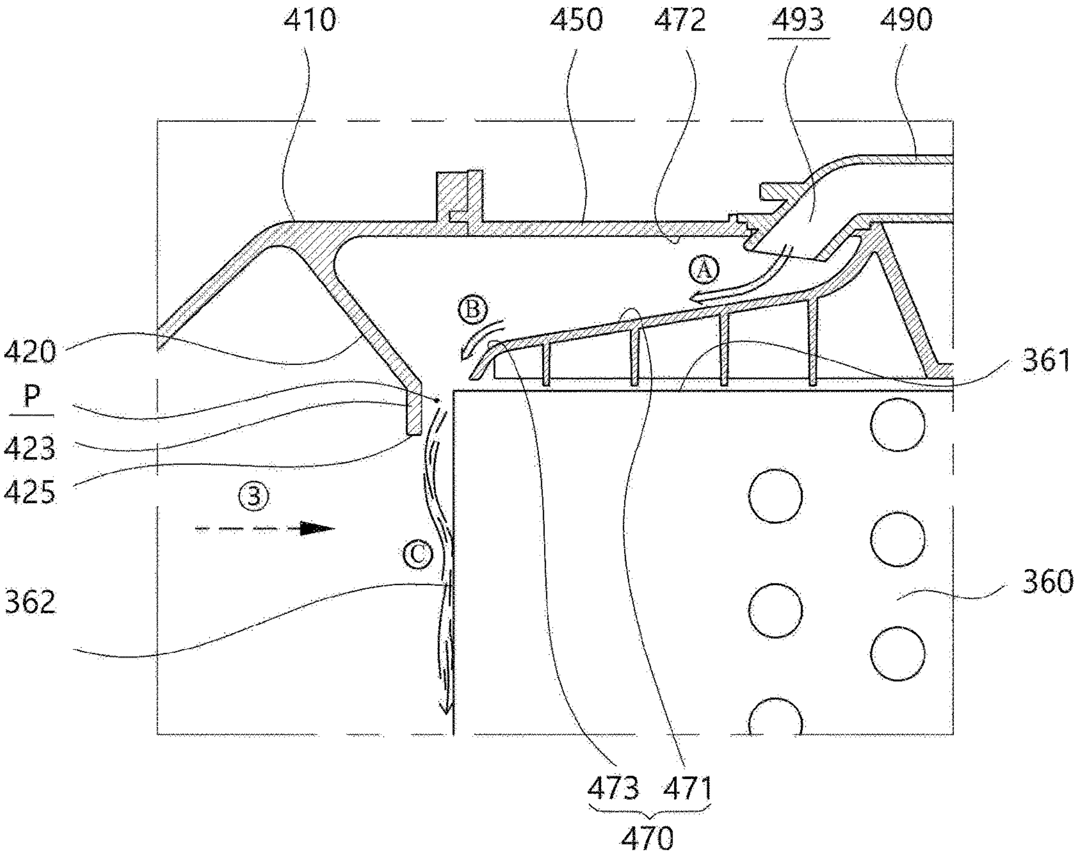
FIG. 14 is an enlarged section view showing a configuration corresponding to part A in FIG. 5 of the washing unit constituting a second embodiment of the laundry processing apparatus according to the present disclosure.
Figure 15:
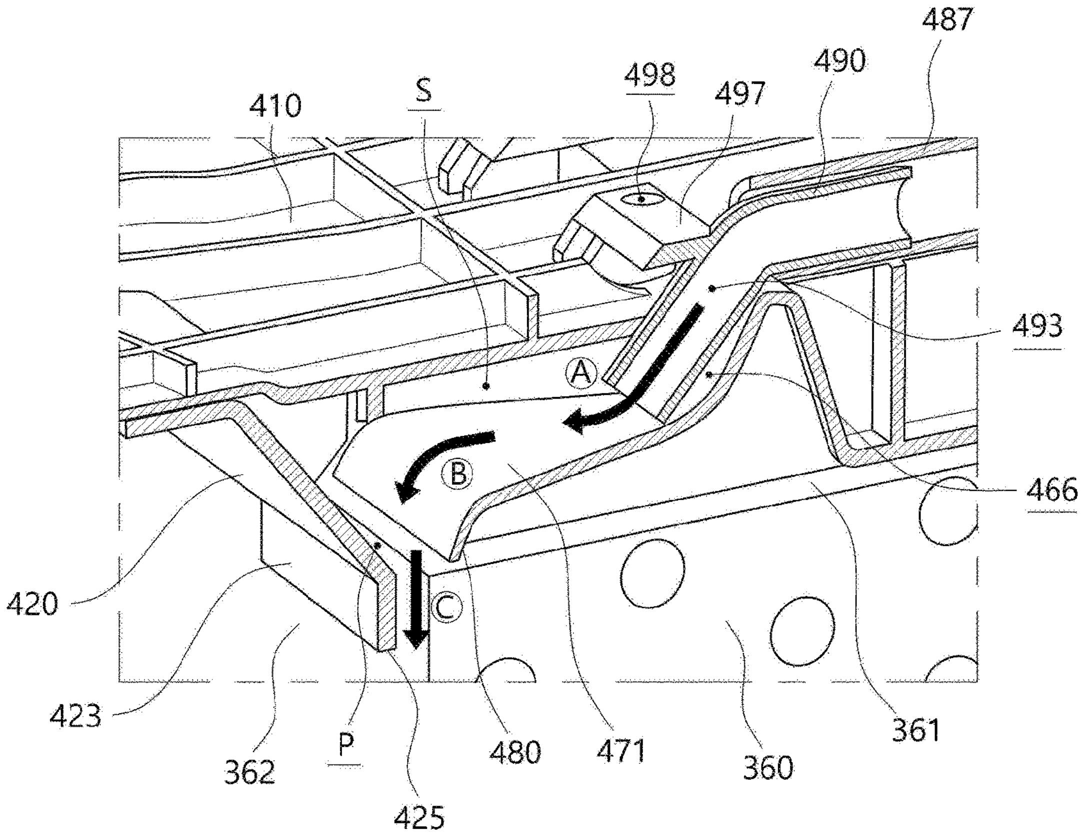
FIG. 15 is a perspective view showing the configuration in a sectional state corresponding to part A in FIG. 5 of the washing unit constituting the second embodiment of the laundry processing apparatus according to the present disclosure.

As shown in FIG. 14, the front guide end 423 is extended from an end of the front guide part 420 in a perpendicular direction. Alternately, the front guide end 423 may not be parallel to the front surface 362 of the evaporator 360, but may be extended with a predetermined relative angle.

The front guide end 423 is positioned at a relatively lower side than the end of the nozzle part (S) along the direction of gravity, that is, along a direction perpendicular to the end of the front guide part 420. In this state, the condensed water sprayed from the nozzle part (S) may be brought into contact with a surface of the front guide end 423 and thereafter be guided toward the front surface 362 of the evaporator 360.

Figure 16:
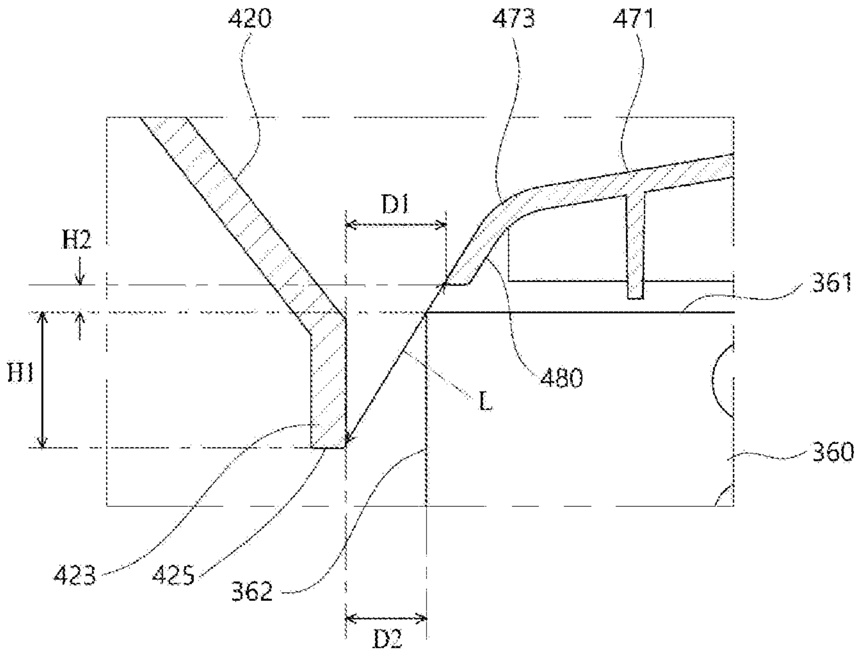
FIG. 16 is an enlarged side view showing a partial structure of the washing unit constituting the second embodiment of the laundry processing apparatus according to the present disclosure.

Referring to FIG. 16, a distance (D1) between an end 425 of the front guide end 423 and a nozzle guide end 480, a protruding height (H1) of the front guide end 423, a distance (D2) between the front guide end 423 and the front surface 362 of the evaporator 360, and a height difference (H2) between the nozzle guide end 480 and the upper surface 361 of the evaporator 360 may be set within predetermined ranges. In the embodiment, (i) the distance (D1) between an end 425 of the front guide end 423 and a nozzle guide end 480 is between 4 mm to 10 mm, (ii) the protruding height (H1) of the front guide end 423 is between 3 mm to 9 mm, (iii) the distance (D2) between the front guide end 423 and the front surface 362 of the evaporator 360 is between 2.0 mm to 5.0 mm, and (iv) the height difference (H2) between the nozzle guide end 480 and the upper surface 361 of the evaporator 360 is between 1.5 mm to 4.5 mm. Of course, the above ranges may vary in response to the flow rate of the condensed water and the amount of washing.

As described above, in a condition in which the distance (D1) between the end 425 of the front guide end 423 and the nozzle guide end 480 is between 4 mm to 10 mm and the protruding height (H1) of the front guide end 423 is between 3 mm to 9 mm, the protruding height (H1) of the front guide end 423 affects the spray angle (β) of spraying the condensed water. Herein, the spray angle (β) is an angle formed between the sprayed condensed water and the front surface 362 of the evaporator 360.

When the spray angle (β) is small, the condensed water is sprayed while deviating to the inside of the evaporator 360 so that the washing function may not be properly performed. On the contrary, when the spray angle (β) is too large, the condensed water is sprayed in the direction away from the front surface 362 of the evaporator 360 so that the evaporator 360 may not be washed. That is, the condensed water discharged from the washing unit (C) is discharged between the nozzle guide end 480 and the front guide part 420 (P, referring to FIG. 15), and it is preferable that the condensed water falls with the predetermined spray angle (β) in the direction away from the front surface 362 of the evaporator 360 based on the direction of gravity.

Meanwhile, when the separate distance (L, referring to FIG. 10) between the front guide end 423 and the nozzle guide end 480 and the protruding height (H1) of the front guide end 423 vary, a value of the spray angle (β) is as follows. Row 1 in table 2 below shows a ratio (H1/L) obtained by dividing the protruding height (H1) of the front guide end 423 by the separate distance (L) between the front guide end 423 and the nozzle guide end 480. Rows 2 to 4 in table 2 show the spray angle (n), and the test was conducted three times. For reference, a value between 7 mm to 11 mm was tested as the separate distance (L) between the front guide end 423 and the nozzle guide end 480 and a value between 0.1 mm to 0.8 mm was tested as the protruding height (H1) of the front guide end 423.

TABLE 2

| H1/L | 0.1 | 0.2 | 0.3 | 0.4 | 0.5 | 0.6 | 0.7 |
|---|---|---|---|---|---|---|---|
| 1 | 28 | 22 | 13 | 11 | 10 | 11 | 13 |
| 2 | 25 | 23 | 15 | 12 | 11 | 9 | 10 |
| 3 | 26 | 19 | 11 | 12 | 9 | 11 | 9 |

Figure 17:
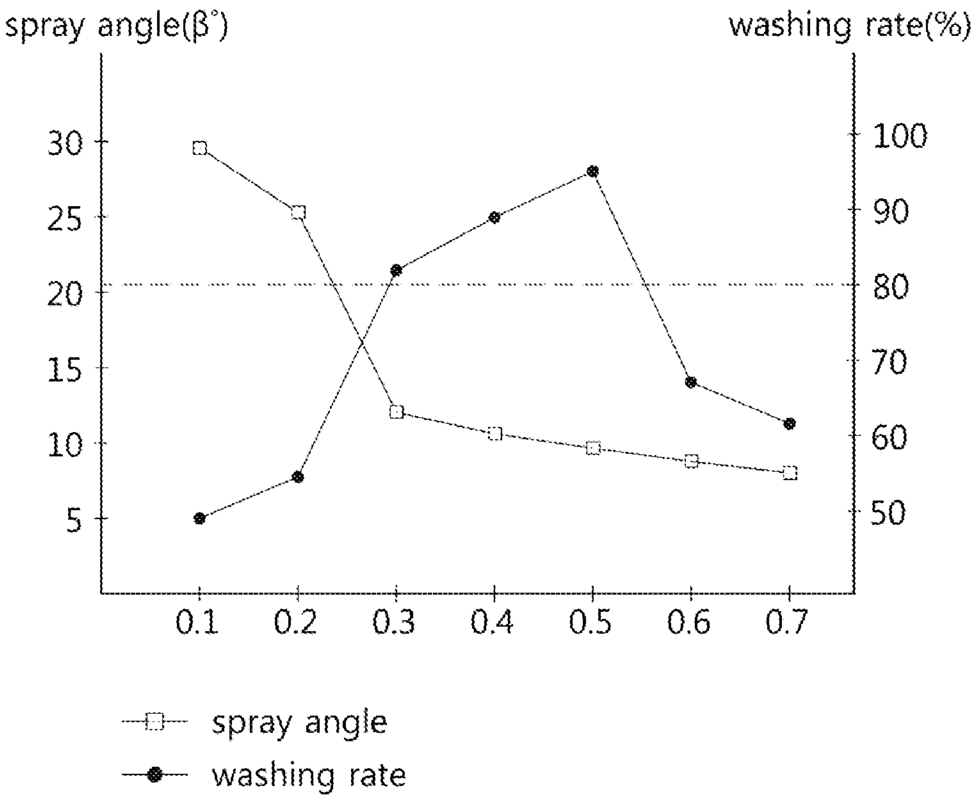
FIG. 17 is a graph showing variations of the spray angle and washing rate in response to a length of an end of a channel that constitutes the second embodiment of the laundry processing apparatus according to the present disclosure.

Results of calculating the washing rate in each case are shown in a graph in FIG. 17. FIG. 17 is the graph showing the variations of the spray angle (§ 3) and the washing rate in response to the protruding height (H1) of the front guide end 423. That is, the graph shows that when the ratio (H1/L) obtained by dividing the protruding height (H1) of the front guide end 423 by the separate distance (L) between the end 425 of the front guide end 423 and the nozzle guide end 480 varies, how the spray angle (β) of the sprayed condensed water varies and how the washing rate varies in response thereto.

As shown in the graph, as the ratio (H1/L) obtained by dividing the protruding height (H1) of the front guide end 423 by the separate distance (L) between the nozzle guide end 480 and the end 425 of the front guide end 423 is increased, the spray angle (β) is gradually reduced and converges to a predetermined level. This means that the spray angle (β) becomes small since as the front guide end 423 further protrudes, the condensed water sprayed through the nozzle part (S) hits the surface of the front guide end 423 and then is guided to the front surface 362 the evaporator 360. When the ratio (H1/L) is equal or higher than 0.3, the decrease of the spray angle (β) is reduced and converges to about 10°.

Meanwhile, as the ratio (H1/L) obtained by dividing the protruding height (H1) of the front guide end 423 by the separate distance (L) between the nozzle guide end 480 and the end 425 of the front guide end 423 is increased, the washing rate is increased and then is reduced again. For reference, the washing rate is obtained by measuring the amount of foreign matter remaining after spraying the condensed water for about 30 seconds on the front surface 362 of the evaporator 360 on which foreign matter is widely spread. Accordingly, this means that when the washing rate is higher, the amount of the remaining foreign matter after washing is small. As shown in the graph, when the ratio (H1/L) is 0.25, the washing rate is about 73%, and when the ratio (H1/L) is 0.3, the washing rate is higher than about 80%. The washing rate which is continuously increased along the ratio (H1/L) is continuously reduced from a starting point when the ratio is 0.5, and the ratio (H1/L) is 0.55, the washing rate is about 80%. The washing rate should be high in order to maintain the efficiency of the heat pump system, so it is preferable that the ratio (H1/L) is between 0.25 to 0.55 in order to maintain the washing rate at about 80% or more. At this time, the spray angle (β) is between 100 to 16°.

Hereinafter, a third embodiment of the present disclosure will be described with reference to FIGS. 18 and 19. For reference, descriptions of the same structures as in the previous embodiments will be omitted, and different structures from the previous embodiments will be described.

The washing unit (C) has the guide end 423 and 480. The guide end 423 and 480 is provided at each of the nozzle part (S) and the front guide part 420 and serves to guide the discharge direction of the condensed water toward the front surface 362 of the evaporator 360.

In the embodiment, the guide end 423 and 480 includes the nozzle guide end 480 provided in the nozzle part (S) and the front guide end 423 provided in the front guide part 420. Herein, the front guide end 423 is a portion where the condensed water sprayed from the nozzle part (S) touches, the condensed water may hit the front guide end 423 and then be guided toward the front surface 362 of the evaporator 360.

Figure 18:
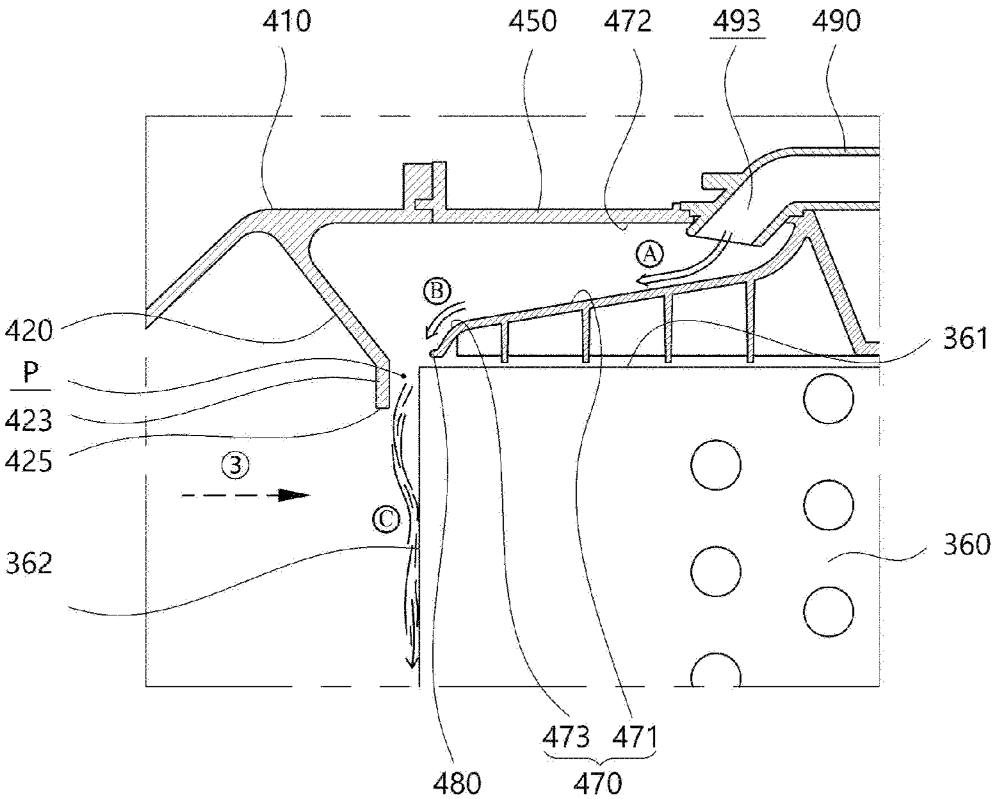
FIG. 18 is an enlarged section view showing a configuration corresponding to part A in FIG. 5 in the structure of the washing unit that constitutes a third embodiment of the laundry processing apparatus according to the present disclosure.
Figure 19:
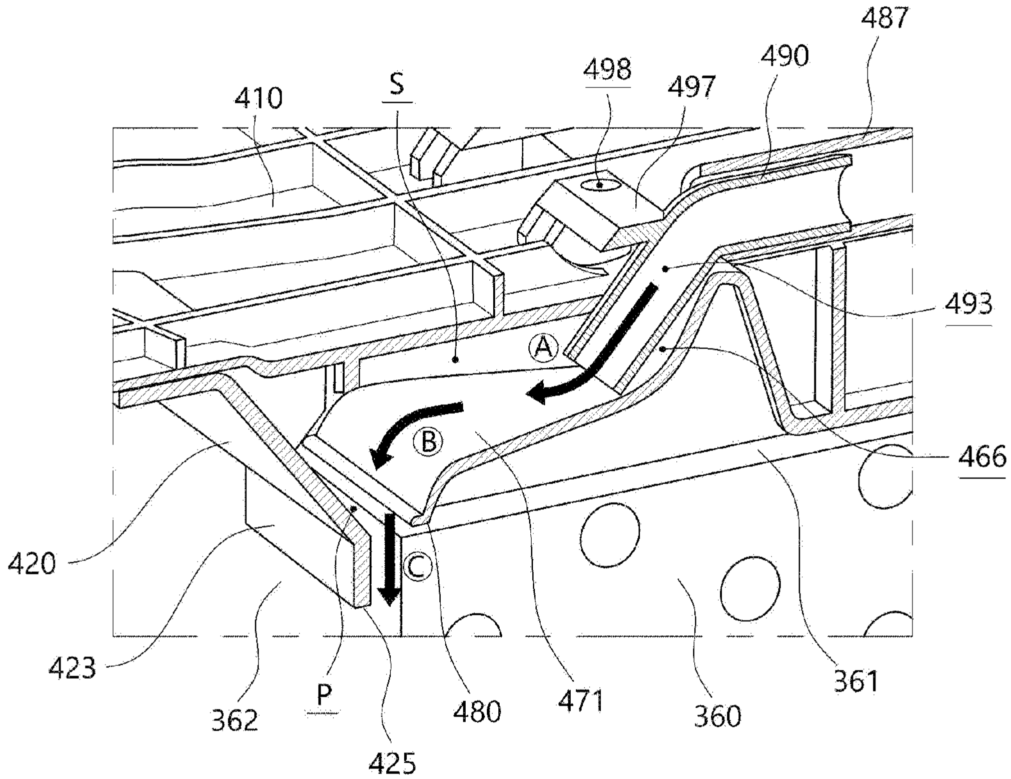
FIG. 19 is a perspective view showing part A in FIG. 5 in a sectional state of the structure of the washing unit that constitutes the third embodiment of the laundry processing apparatus according to the present disclosure.

As shown in FIG. 18, the front guide end 423 is extended from the end of the front guide part 420 in the perpendicular direction. Alternately, the front guide end 423 may not be parallel to the front surface 362 of the evaporator 360, but may be extended with a predetermined relative angle.

The nozzle guide end 480 is positioned at an end of the discharge channel 473. The nozzle guide end 480 further protrudes from the end of the nozzle part (S) toward the front guide part 420 and serves to guide the discharge direction of the condensed water toward the front guide part 420. The nozzle guide end 480 looks like a protrusion when the nozzle guide end is shown from the side section view as shown in FIG. 18, but the nozzle guide end 480 is extended in a long shape in a width direction of the nozzle part (S) as shown in FIG. 19.

As described above, in the embodiment, (i) the condensed water discharged through the nozzle part (S) is guided by the nozzle guide end 480 so that the discharge direction of the condensed water is guided toward the front guide part 420, and (ii) the condensed water may be guided toward the front surface 362 of the evaporator 360 after hitting the front guide end 423. Accordingly, the condensed water can flow precisely along the front surface 362 of the evaporator 360 to clean the evaporator 360.

Although preferred embodiments of the present disclosure has been described for illustrative purposes, those skilled in the art will appreciate that various modifications, additions and substitutions are possible, without departing from the scope and spirit of the present disclosure as disclosed in the accompanying claims. Therefore, the preferred embodiments described above have been described for illustrative purposes, and should not be intended to limit the technical spirit of the present disclosure, and the scope and spirit of the present disclosure are not limited to the embodiments. The protective scope of the present disclosure should be interpreted by the accompanying claims, and all technical spirits within the equivalent scope should be interpreted as being included in the scope and spirit of the present disclosure.

What is claimed is:

1. A laundry processing apparatus comprising:

a cabinet that defines an installation space therein;

a heat exchanger disposed in the installation space of the cabinet and configured to transfer heat of exhaust air generated from a heat-processing of laundry, the heat exchanger having a front surface configured to receive the exhaust air; and a washing unit that is disposed inside the installation space of the cabinet, that is disposed at an upper portion of the heat exchanger, and that is configured to spray washing water to the front surface of the heat exchanger, wherein the washing unit comprises:

a water tube configured to supply the washing water toward the heat exchanger, a nozzle part that is disposed at the upper portion of the heat exchanger, that extends in an inclined direction with respect to an upper surface of the heat exchanger, and that is configured to guide the washing water toward the heat exchanger, the nozzle part having a first side connected to the water tube and a second side that extends toward the front surface of the heat exchanger, a front guide part spaced apart from the nozzle part, the front guide part comprising a protruding end that extends toward the front surface of the heat exchanger and is configured to guide the washing water discharged from the nozzle part toward the front surface of the heat exchanger, wherein the front surface of the heat exchanger is disposed between the front guide part and the nozzle part, and a front guide end protruding from the front guide part and having an end protruding to a position lower than an upper surface of the heat exchanger.

2. The laundry processing apparatus of claim 1, wherein the front guide end having a first length from the end of the front guide part and being spaced apart from the end of the nozzle part by a first distance, and wherein a relative ratio of the first length with respect to the first distance is between 0.25 to 0.55.

3. The laundry processing apparatus of claim 1, wherein the front guide end extends from the end of the front guide part in a perpendicular direction with respect to the upper surface of the heat exchanger.

4. The laundry processing apparatus of claim 3, wherein a lower end of the front guide end is disposed vertically below the end of the nozzle part.

5. The laundry processing apparatus of claim 1, wherein the nozzle part is connected to an outlet of the water tube.

6. The laundry processing apparatus of claim 5, wherein the nozzle part comprises:

a base that extends from the outlet of the water tube toward the front surface of the heat exchanger, the base being inclined with respect to the upper surface of the heat exchanger, and a cover that extends from the outlet of the water tube and is spaced apart from the base in an upward direction with respect to the base, and wherein the nozzle part defines a nozzle space between the base and the cover.

7. The laundry processing apparatus of claim 1, wherein the end of the nozzle part is spaced apart and retracted from the front surface of the heat exchanger in a direction toward the water tube.

8. The laundry processing apparatus of claim 7, wherein the end of the nozzle part is spaced apart from an upper surface of the heat exchanger and disposed vertically above the heat exchanger in a direction of gravity.

9. The laundry processing apparatus of claim 1, wherein a virtual line extending from an upper surface of the end of the nozzle part passes through the front guide end.

10. The laundry processing apparatus of claim 6, wherein the washing unit is configured to discharge the washing water through the base constituting the nozzle part, and wherein a spray angle of the washing water sprayed in a direction away from the front surface of the heat exchanger is between 5° to 15° with respect to the front surface of the heat exchanger.

11. The laundry processing apparatus of claim 1, wherein the cabinet comprises a base cover that defines the installation space and that covers at least a part of the upper portion of the heat exchanger, and wherein the washing unit is disposed at the base cover and faces the heat exchanger.

12. A laundry processing apparatus comprising:

a cabinet that defines an installation space therein;

a heat exchanger disposed in the installation space of the cabinet and configured to transfer heat of exhaust air generated from a heat-processing of laundry, the heat exchanger having a front surface configured to receive the exhaust air;

a base cover that covers an upper portion of the heat exchanger;

a water tube configured to supply washing water toward the heat exchanger;

a nozzle part that is disposed at the base cover, that extends in an inclined direction with respect to an upper surface of the heat exchanger, and that is configured to guide the washing water toward the heat exchanger, the nozzle part having a first side connected to the water tube and a second side that extends toward the front surface of the heat exchanger;

a front guide part that is disposed at the base cover and spaced apart from the nozzle part, the front guide part comprising a protruding end that extends toward the front surface of the heat exchanger and is configured to guide the washing water discharged from the nozzle part toward the front surface of the heat exchanger, wherein the front surface of the heat exchanger is disposed between the front guide part and the nozzle part; and a front guide end protruding from the front guide part and having an end protruding to a position lower than an upper surface of the heat exchanger.

* * * * *